United States Patent
Chimento

(10) Patent No.: US 7,427,016 B2
(45) Date of Patent: Sep. 23, 2008

(54) SYSTEM AND METHOD FOR SCREENING FOR FRAUD IN COMMERCIAL TRANSACTIONS

(76) Inventor: Marc A. Chimento, 12600 Genito Rd., Midlothian, VA (US) 23112

( * ) Notice: Subject to any disclaimer, the term of this patent is extended or adjusted under 35 U.S.C. 154(b) by 0 days.

(21) Appl. No.: 11/734,316

(22) Filed: Apr. 12, 2007

(65) Prior Publication Data

US 2007/0244782 A1 Oct. 18, 2007

Related U.S. Application Data

(60) Provisional application No. 60/791,198, filed on Apr. 12, 2006.

(51) Int. Cl.
*G06F 7/00* (2006.01)
*G06Q 40/00* (2006.01)

(52) U.S. Cl. .............................. 235/376; 705/35; 705/45

(58) Field of Classification Search ................. 235/376, 235/380, 379; 705/35, 45
See application file for complete search history.

(56) References Cited

U.S. PATENT DOCUMENTS

| 5,781,654 A | * | 7/1998 | Carney | ........................ 382/137 |
| 6,029,154 A | | 2/2000 | Pettitt | |
| 2003/0218061 A1 | * | 11/2003 | Filatov | ........................ 235/379 |
| 2006/0210138 A1 | * | 9/2006 | Hilton et al. | ................. 382/137 |

FOREIGN PATENT DOCUMENTS

WO   WO 97/26615   *   9/1997

OTHER PUBLICATIONS

Integrated Payment Systems website (wwww.fdcips.com) as accessed on Mar. 28, 2007.
Positive Pay "New Host Validation Screen," about Jan. 2007.
"All About Positive Pay" from www.positivepay.net as accessed on Mar. 5, 2007.
"Check Fraud" from www.safechecks.com as accessed on Apr. 11, 2007.
Safe Checks Product Catalog from www.safechecks.com as accessed on Apr. 11, 2007.
"Check Fraud, A Guide to Avoiding Losses," by the Check Fraud Working Group, Feb. 1999.

* cited by examiner

*Primary Examiner*—Daniel A Hess
(74) *Attorney, Agent, or Firm*—McNees Wallace & Nurick, LLC

(57) ABSTRACT

A method for screening for potential fraud in commercial paper is provided. For example, a method of the invention comprises steps of presenting a check for cashing to a check cashing agent (e.g., a bank teller); scanning or inspecting the check for data; selecting data for analysis; analyzing selected data with a commercial paper fraud detection system ("CPFDS"); and reporting results of the fraud detection system analysis to the check cashing agent. The commercial paper fraud detection system provides a means for predicting if commercial paper is potentially fraudulent. For example, the commercial paper fraud detection system may detect stolen checks, altered checks, and fabricated or counterfeit checks, among other types of fraud. Also provided is a computer program product for detecting fraud in commercial paper.

25 Claims, 15 Drawing Sheets

SYSTEM AND METHOD FOR SCREENING FOR FRAUD IN COMMERCIAL TRANSACTIONS

CROSS REFERENCE TO RELATED APPLICATIONS

This application claims the priority of U.S. provisional patent application No. 60/791,198, filed Apr. 12, 2006, which is incorporated herein by reference in its entirety.

FIELD OF THE INVENTION

The present invention relates generally to a system and a method for screening for fraud in commercial transactions, particularly for screening for fraud in commercial paper, such as checks and the like.

BACKGROUND OF THE INVENTION

Commercial paper fraud, particularly check fraud, is one of the largest challenges facing businesses and financial institutions today. With the advancement of computer technology it is increasingly easy for criminals, either independently or in organized gangs, to manipulate checks to deceive innocent victims. Victims include financial institutions, businesses who accept and issue checks, bank consumers, and insurance companies, among others. In most cases, these crimes begin with the theft of a financial document, and it may be perpetrated as easily as someone stealing a blank check from a home or vehicle during a burglary, searching for a canceled or old check in the garbage, or removing a check from a mailed bill payment.

Experienced bank tellers often are able to identify suspicious checks based upon identification of certain signs that may indicate a fraudulent check, for example, if a check lacks perforations or the check number is missing. If a check number is low, e.g. 101 up to about 400 on personal checks or 1001 up to about 1500 on business checks, then the likelihood that a check is fraudulent is increased inasmuch as bad checks are often written on accounts less than one year old. Furthermore, a bank teller may notice that the type of font used to print the customer's name is different from the font used to print the address or that additions to the check, e.g. phone numbers, have been written by hand. Likewise, lack of an account holder's address or the address of the bank is suspicious, as well as stains or discolorations on the check possibly caused by erasures or alterations. Most payroll, expenses, and dividend checks are printed via computer so it is suspicious if the name of the payee for such a check appears to have been printed by a typewriter. Other obvious deficiencies include the word "VOID" appearing across the check and the lack of an authorized signature. While the foregoing may appear to be suspicious to an experienced bank teller, other types of fraud are less obvious.

A significant amount of check fraud is due to counterfeiting and forgery or otherwise manipulating the information on a check to the benefit of a criminal. For a business, forgery typically takes place when an employee issues a check without proper authorization. Criminals may also steal a check, endorse it and present for payment at a retail location or at the bank teller window, often using bogus personal identification. Counterfeiting of checks is possible with readily available desktop publishing equipment including a personal computer, scanner, sophisticated software and printer, or simply duplicating a check with advanced color photocopiers. Paperhanging is another fraud technique in which someone purposely writes a check on a closed account or reorders checks on a closed account. Check kiting, yet another form of check fraud, is the act of opening accounts at two or more institutions and using the float time of available funds to create fraudulent balances; this fraud has recently become easier because of new regulations requiring banks to make funds available sooner.

Businesses and banks experience considerable losses of money and time each year due to the prevalence of individuals perpetrating fraudulent check schemes. Annual economic losses due to check fraud are in the billions of dollars and continue to grow steadily as criminals profit from defrauding victims. For the consumer, the amount of inconvenience and anxiety caused by resolving problems with the account, local merchants, as well as possible repercussions with credit bureaus may be considerable.

To combat the problem of fraudulent checks some banks have instituted fraud protection services in which selected information is transmitted by the writer of the check directly to the bank holding the business's account at the time the check is written. Then, when the check is presented for payment at the bank, the check is compared with information provided directly to the bank by the writer of the check. The system requires extra effort on the part of the business and typically the bank charges extra fees for this service whether or not any fraudulent checks are identified.

Accordingly, there is a need for a system and method for screening for fraudulent checks, as well as other forms of commercial paper, in a manner that minimizes additional effort or disruption to the account owner and that generally overcomes the above-noted deficiencies.

SUMMARY OF THE INVENTION

A method for screening for potential fraud in commercial paper is provided. For example, a method of the invention comprises steps of presenting commercial paper for cashing to a commercial paper cashing agent (e.g., a bank teller or a merchant); scanning or inspecting the commercial paper for data; selecting data for analysis; analyzing selected data with a commercial paper fraud detection system ("CPFDS"); and reporting results of the fraud detection system analysis to the commercial paper cashing agent. The commercial paper fraud detection system provides a means for predicting if commercial paper is potentially fraudulent. For example, the commercial paper fraud detection system may detect stolen checks, altered checks, and fabricated or counterfeit checks, among other types of fraud. Also provided is a computer program product for detecting fraud in commercial paper.

Accordingly, in an example embodiment, the invention includes a computer program product embodied on a computer readable medium and executable by a microprocessor for detecting fraud in commercial paper comprising computer instructions for executing the steps of (1) scanning commercial paper for data, wherein the commercial paper has been received by a commercial paper cashing agent; (2) determining one or more attributes based on the data; (3) calculating a risk indicator for the commercial paper, wherein the risk indicator is a mathematical function of the attributes; and (4) reporting the risk indicator to the commercial paper cashing agent.

In another example embodiment, the invention includes a commercial paper fraud detection method comprising the steps of (1) receiving commercial paper by a commercial paper cashing agent; (2) scanning the commercial paper for data; (3) determining one or more attributes based on the data; (4) calculating a risk indicator for the commercial paper, wherein the risk indicator is a mathematical function of the attributes; and (5) reporting the risk indicator to the commercial paper cashing agent.

The commercial paper cashing agent may be a bank holding an account against which the commercial paper is drawn, the commercial paper being received with a contemporaneous demand for payment in cash or its equivalent. The bank may use the commercial paper fraud detection system to assist in arriving at a decision of either honoring or dishonoring the commercial paper. The commercial paper cashing agent may also be a bank not holding an account against which the commercial paper is drawn. Similarly, the commercial paper cashing agent may be a merchant, the commercial paper being received in consideration for goods or services.

In an illustrative embodiment, the commercial paper is a check (or a draft), and the data analyzed by the commercial paper fraud detection system are selected from the group consisting of the identity of the drawer (e.g., the person who signs the check), the identity of the drawee (e.g., the name of the bank), the check number, the issue date, the payment amount, the account number, the account type (e.g., business or personal checking account), and the date, time, and location (e.g., the branch office of a bank) of receiving the check. The commercial paper fraud detection system assigns various risk attributes to the check based on these data in conjunction with information from a database. Example attributes include a known/unknown account number attribute; a duplicate check number attribute; an expected check number attribute; an expected minimum check number attribute; a location activity attribute; an historical activity attribute (such as an average annual activity attribute, a total annual activity attribute, an average quarterly activity attribute, a total quarterly activity attribute, an average monthly activity attribute, a total monthly activity attribute, an average biweekly activity attribute, a total biweekly activity attribute, an average weekly activity attribute, or a total weekly activity attribute, by way of example only); a payment amount limit attribute; and a foreign account attribute, among others. Based on such attributes, a risk indicator for the check is calculated and reported to the bank teller, and the data stored in the database for future reference.

Rather than relying solely on the experience and intuition of a bank teller or cashier that is presented with commercial paper for payment, the system predicts the likelihood that commercial paper is fraudulent and therefore can prevent an improper transaction from occurring. The system incorporates additional information currently not available to the typical bank teller, including, in some embodiments, a quantitative assessment of the likelihood of fraud based on certain attributes of the commercial paper. For example, when a check is presented for payment, attributes of the check that may be analyzed by the system include whether the check number is a duplicate of a previously cashed check, whether checks drawn on the same account have been cashed at another bank branch office on the same day, whether the amount of the check is not consistent with historical activity patterns for the account, and whether the check number is out of sequence. Such attributes are quantitatively analyzed according to customizable criteria. The system enables a banking institution to implement and enforce a check cashing policy based on quantitative analysis of predetermined criteria, rather than permitting individual bank tellers to cash checks at their discretion based on qualitative guidelines.

The system is configurable and, in an embodiment, provides a configuration tool to enable the bank administrator to configure the database for particular business requirements unique to the bank. In an exemplary embodiment, the CPFDS comprises several components and processes, including, for example, a nightly data process, a user interface, configuration and management tools, reporting modules, manuals, a software installation application, and the like. In an embodiment, the system includes a database module that monitors, tracks and identifies fraud schemes, including patterns that may be indicative of new forms of fraud. For example, the system may be self-teaching and "learn" to identify new forms of fraud by analyzing collected data.

Other features and advantages of the present invention will be apparent from the following more detailed description of preferred embodiments, taken in conjunction with the accompanying drawings that illustrate, by way of example, the principles of the invention.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Figure 1:
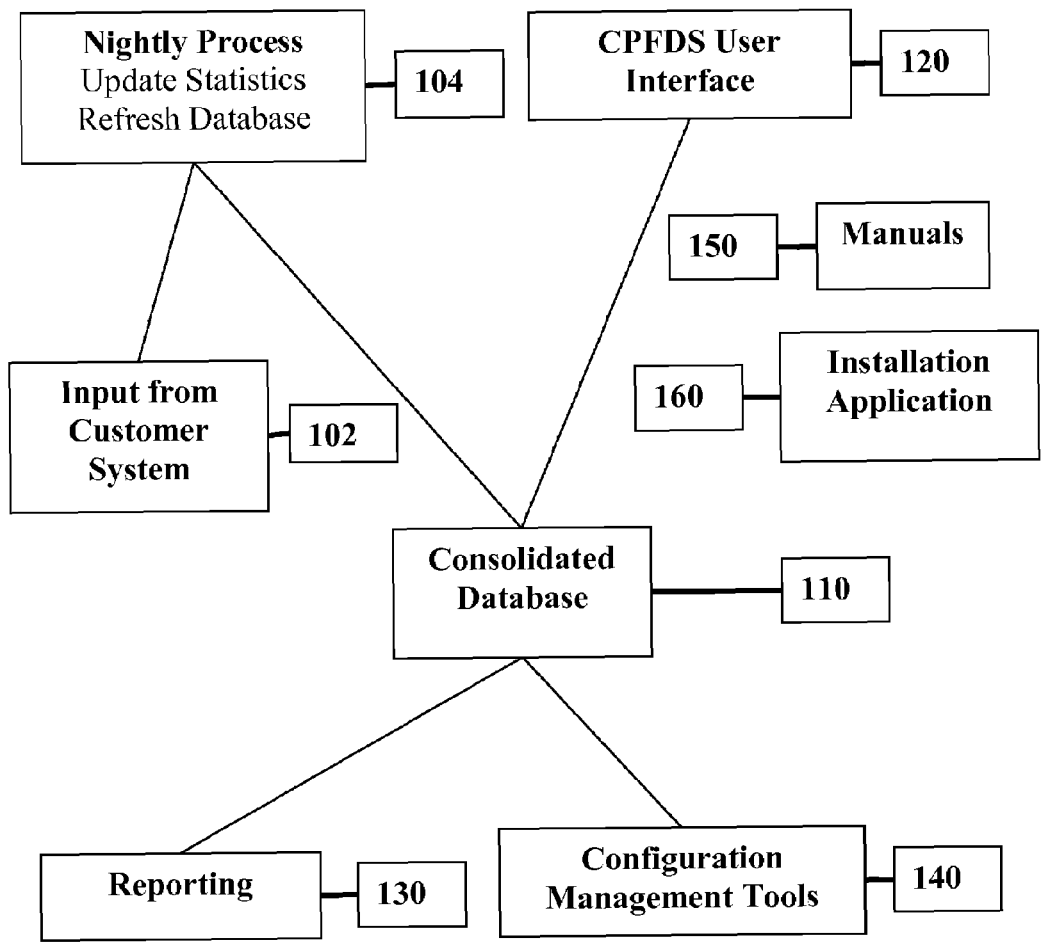
FIGS. 1-2 illustrate some typical components of a commercial paper fraud detection system ("CPFDS") according to an embodiment of the invention.

Before turning to the figures which illustrate the exemplary embodiments in detail, it should be understood that the application is not limited to the details or methodology set forth in the following description or illustrated in the figures. It should also be understood that the terminology employed herein is for the purpose of description only and should not be regarded as limiting.

In an embodiment, the invention provides a commercial paper fraud detection system ("CPFDS") and related methods for screening for fraudulent commercial paper, e.g. at the time of presentment for payment. A commercial paper fraud detection system is relevant to the activities associated with a demand to enforce commercial paper such as a check, including the initial point of contact between a financial institution and anyone bearing commercial paper, e.g. a person or a business entity. For example, when a person enters a bank off the street and hands over to a teller a check drawn on an account held by that bank, and the person demands that the teller pay out the stated amount of money as cash, a wire transfer, any negotiable instrument, etc., a CPFDS may be used to screen for fraud. Likewise, a CPFDS may also be used to screen for fraud when a person enters a bank, check cashing agent, merchant, or any commercial paper cashing institution, hands over a check that is not drawn on an account held by that financial institution, and demands that the stated amount of money be paid. In general, the process by which a financial institution or merchant decides whether or not to honor commercial paper, and thereby relinquish control over its money, may be guided by a CPFDS of the invention.

When a bank receives a check or other commercial paper for payment, it is common practice for the teller to confirm that the check is properly endorsed, that sufficient funds are present in the relevant account, and that a stop payment order has not been placed on the check, e.g. if the check was reported to be stolen. Additional criteria are often not evaluated. State of the art methods lack a comprehensive tool to analyze the likelihood that a check presented for payment is fraudulent, particularly the quantitative assessment of historical activity data for a checking account, and other related attributes. The invention provides such a tool for the quantitative evaluation of the likelihood that commercial paper, such as a check, is fraudulent.

An advantageous embodiment of the invention is in the form of a computer program executed by a computer, such as a personal computer. In an embodiment of the invention, attributes of commercial paper (e.g., a check) presented for payment are identified and their relative contribution to the quantitative likelihood of fraud are calculated by a computer-based system that is easily distributed throughout an organization. Such a computer program enables a bank teller to evaluate risk associated with cashing a check using a single tool. Of course, the principles of the invention do not limit its implementation solely as a computer program, and the invention may be practiced with equal efficacy and value using alternative techniques.

In an embodiment of the invention, the commercial paper fraud detection system includes a database, acquisition port for collecting data from the commercial paper at the time of presentment for payment, a processor/controller, a report port and optionally an input port. The method includes building a database, obtaining data from the commercial paper at the time of presentment or payment; analyzing for the potential presence of fraud by comparing selected data from the document presented with pre-selected database information and scoring the comparison; and reporting identified suspicious documents to the institution from which payment is requested. The method is intended for use in alerting a financial institution or other commercial paper cashing agency personnel to the potential of fraud so that an altered or fraudulent document is identified and the transaction may be halted until an investigation is conducted. Optionally, the system includes provision for revising data selected for comparison or algorithms used in scoring to accommodate inclusion of revised scoring parameters or selection of new marker data as new fraudulent schemes are identified.

In another embodiment, the invention includes a knowledge-based system that contains subject-specific knowledge of one or more human experts or bank administrators, including the personal knowledge, skill, and expertise of banks, merchants, law enforcement, and account holders. The system includes a program made up of a set of rules that analyze information supplied by the user of the system about specific attributes of commercial paper presented for payment, as well as providing an analysis thereof, and, in some embodiments, recommending a course of user action in order to prevent a fraudulent transaction from occurring. Such a system may be valuable to banks and other such financial organizations that have a high-level of knowledge and expertise that cannot be easily transferred to other members or branch offices. The invention provides a mechanism for conveying the intelligence and information found throughout an institution and providing this knowledge to other members of an organization for loss-prevention purposes. The invention also provides a means for enforcing a payment policy in accordance with established business, legal, and accounting principles. A risk assessment may also be provided for the particular attributes of commercial paper deemed by a financial institution to be important.

An example implementation of the invention includes a computer program product embodied on a computer readable medium and executable by a microprocessor for predicting fraud incorporating computer instructions for executing the steps of the various methods described herein. While it is preferred that control algorithms be embodied in a computer program and executed by the microprocessor, it is to be understood that control algorithms may be implemented and executed using digital or analog hardware by those skilled in the art.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. A computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output or input/output devices (including but not limited to keyboards, displays, pointing devices, etc.) can be coupled to the system either directly or through intervening input/output controllers.

Network adapters may also be coupled to the system to enable the data processing system to become coupled to other data processing systems or remote printers or storage devices through intervening private or public networks. Modems, cable modem and ethernet cards are just a few of the currently available types of network adapters.

A database may be used to store account and check number historical data and related information. Data processing may be performed on a networked computer physically separated from the computer hosting the user interface (UI). For example, a database may be internal to a bank and include only records pertaining to accounts at that bank. Alternatively, an external system may be available to communicate with multiple financial institutions and merchants. It may be preferable for the database to be located at a central location, such as a headquarters or control station. The database may be hosted on a single local device, or it may comprise a multiple server configuration operating in a local or distributed environment.

The data processing infrastructure may also comprise other single, multiple, or networked computers or microprocessors; single or multiple servers; hardware; software; firmware; software and software instructions comprising firmware; and any other combination of computing and storage means, as well as programming means, for establishing communications with and for controlling distributed points and devices within a commercial paper fraud detection system, and for accepting, storing, caching, searching for, requesting, serving, and loading data and information.

The user interface may be a graphical user interface (GUI) that is web-based and implemented using standard html/http (or https) methods. The software may be configured to communicate with a server computer that hosts the database by a variety of means, including TCP/IP implemented over an ethernet (LAN) or the internet (WAN). The network may be wholly internal to a financial institution, or it may incorporate external communication means. Example interfaces and communications protocols may include, but are not limited to, a digital subscriber line (DSL) (symmetric DSL, concentric DSL, and asymmetric DSL), a telephone line, a wireless or cellular network, a parallel printer port, USB, or IEEE 1394 port.

Therefore, in an embodiment, the invention includes a computer program product embodied on a computer readable medium and executable by a microprocessor for detecting fraud in commercial paper comprising computer instructions for executing the steps of (1) scanning commercial paper for data, wherein the commercial paper has been received by a commercial paper cashing agent; (2) determining one or more attributes based on the data; (3) calculating a risk indicator for the commercial paper, wherein the risk indicator is a mathematical function of the attributes; and (4) reporting the risk indicator to the commercial paper cashing agent.

In another embodiment, the invention provides a commercial paper fraud detection method comprising the steps of (1) receiving commercial paper by a commercial paper cashing agent; (2) scanning the commercial paper for data; (3) determining one or more attributes based on the data; (4) calculating a (quantitative) risk indicator for the commercial paper, wherein the risk indicator is a mathematical function of the attributes; and (5) reporting the risk indicator to the commercial paper cashing agent. The method may also comprise a step of comparing the data with a database or a step of entering the data into a database. In an embodiment, the magnitude of the risk indicator is proportional to the risk that the commercial paper is fraudulent. For example, the larger the risk indicator, the more likely that the commercial paper is fraudulent.

According to an example embodiment, the mathematical function employed in a method of the invention may be addition. In an example configuration, each of the one or more attributes has a value of at least zero and each of the one or more attributes has a value of equal to or less than about 100%.

The determining step according to an example embodiment of a method of the invention may include a step of determining three or more attributes, in which case the risk indicator is the sum of the values of the three or more attributes. In another embodiment, the determining step includes a step of determining five or more attributes, in which case the risk indicator is the sum of the values of the five or more attributes. In yet another embodiment, the determining step includes a step of determining seven or more attributes, in which case the risk indicator is the sum of the values of the seven or more attributes.

The commercial paper cashing agent may be a bank holding an account against which the commercial paper is drawn, the commercial paper being received with a contemporaneous demand for payment in cash or its equivalent, in which case the aforementioned method may further comprise a step of either honoring or dishonoring the commercial paper. The commercial paper cashing agent may also be a bank not holding an account against which the commercial paper is drawn. Similarly, the commercial paper cashing agent may be a merchant, the commercial paper being received in consideration for goods or services. For example, the commercial paper may be a check (or a draft) and the commercial paper cashing agent may be a bank. A commercial paper cashing agent may include a bank or other financial institution, as well as a merchant that accepts commercial paper as payment. In an embodiment, a commercial paper cashing agent is a check cashing agent or an entity that accepts commercial paper as payment.

As used herein, the term "commercial paper" includes a check (or draft). For convenience, the system and methods are described hereinafter as related specifically to checks and check cashing, particularly to check cashing by banks. However, as one skilled in the art will appreciate, the system and methods are equally applicable to other forms of commercial paper other than checks. Also, while the system is described in terms of use in a bank, it is equally applicable for use by any commercial paper cashing agent such as merchants, check cashing agents, credit unions, and government agencies, among others.

Accordingly, in an example embodiment, the invention provides a check fraud detection method comprising the steps of (1) receiving a check by a check cashing agent; (2) scanning the check for data; (3) determining one or more attributes based on the data; (4) calculating a risk indicator for the check, wherein the risk indicator is a mathematical function of the attributes; and (5) reporting the risk indicator to the check cashing agent. The data may be selected from the group consisting of the identity of the drawer, the identity of the drawee, the check number, the issue date, the payment amount, the account number, the account type, and the date, time, and location of receiving the check.

In an example embodiment, the one or more attributes comprise a known/unknown account number attribute, wherein the known/unknown account number attribute has a value of 100% when the account number is unknown to the commercial paper (e.g., check) cashing agent, or 0% when the account number is known to the commercial paper cashing agent. According to the known/unknown account number attribute, the bank teller is not permitted to cash a check for an unknown account.

In yet another embodiment, the one or more attributes comprise a duplicate check number attribute, wherein the duplicate check number attribute has a value of 100% when the check number is the same as a check number of a check previously paid for the account number, or 0% when the check number is unique with respect to checks previously paid for the account number. The duplicate check number attribute prohibits payment of a check having a duplicate check number of a check previously paid on an account.

In still yet another embodiment, the one or more attributes comprise an expected check number attribute, wherein the expected check number attribute has a value of from about 0% to about 100%, the value being proportional to the magnitude of the difference between the check number and a calculated prediction of the expected next check number for the account number. The expected check number attribute (as well as other attributed described herein) may be sub-weighted. For example, if a check number is out of sequence by 10% and the bank has configured this attribute to be only 80% relevant, then the total value for this attribute may be 10% times 80% (or 8%). One skilled in the art will appreciate other possible sub-weighting schemes. The system may perform nightly algorithms to determine the expected next check number based on historical check writing habits. If this attribute is triggered, the system calculates how far off the check number is compared to what the system expects. If the check number is only a few numbers off, the probability of the check being fraudulent is lower than if the check number is, e.g., 500 numbers out. The system uses a configurable set of data to determine how much weight to apply to the final attribute calculation.

In yet another embodiment, the one or more attributes comprise an expected minimum check number attribute, wherein the expected minimum check number attribute has a value of from about 0% to about 100% when the check number is below a calculated prediction of the expected minimum check number for the account number, the value being proportional to the magnitude of the difference between the check number and the calculated prediction of the expected minimum check number, or 0% when the check number is above a calculated prediction of the expected minimum check number for the account number. The system may perform nightly algorithms to determine the minimum check number expected. If a check number is low, the attribute is triggered and the calculated weight is added to the total value of the risk indicator. The system calculates how far below the check number is compared to what it expects and weights it according to configurable ranges. This attribute may also be configured to reject any checks below a certain check number, for example, to prohibit payment of old checks or checks within a range that have been reported to be stolen or lost.

In yet another embodiment, the one or more attributes comprise a location activity attribute, wherein the location activity attribute has a value of from about 0% to about 100%, the value being proportional to the number of checks or the payment amounts thereof previously paid for the account number at different locations of the commercial paper cashing agent. For example, when two or more checks are cashed on the same day by different bank locations, fraud may be suspected. In a common check fraud scheme, a thief successfully cashes a stolen check at a branch office of a bank. Feeling confident and in order to minimize suspicion, the thief next attempts to cash another stolen check at a different branch office. Before the bank or the account holder becomes aware of the fraud, the thief may have successfully cashed many checks, each at a different branch office of the bank.

People and (especially) businesses generally write the same total dollar amount in checks during specific times of the year, month or week. In an embodiment, the system provides a mechanism to track check writing habits for customers during specific intervals during a month. The system tracks these habits and uses this information to determine if the total amount of the checks processed during an interval exceeds the total amount so far for the time period in question. If an historical activity attribute is triggered, the weight is added to the total value of the risk indicator. The system uses a configurable set of data to determine how much weight to apply to the final attribute calculation. Similar to the total amount habits attribute, the system calculates the average amount of each check cashed during the period of time. If the amount of the check is higher than the average, the attribute is triggered and the weight is added to the total risk indicator value. The system also uses a configurable set of data to determine how much weight to apply to the final attribute calculation. These intervals can be configured for any valid start day and end day of a month. The interval may be defined as a single day or a whole month and every interval combination in between. The system uses these intervals to compare the usual dollar amount spent to the current check amount.

Accordingly, in an embodiment, the one or more attributes comprise an historical activity attribute, wherein the historical activity attribute has a value of from about 0% to about 100%, the value being proportional to the magnitude of the difference between the payment amount of the check and the average or total payment amount of previously paid checks for the account number during a preceding time period. By comparison with historical account activity, fraud may be identified. For example, if a home mortgage payment is usually paid from a certain checking account in the first week of each month, then fraud may be suspected if a check in the same amount is presented for payment at a different time of the month. Likewise, if a large check is usually paid from a certain checking account twice per year (e.g., for tuition to an expensive university), then fraud may be suspected if an extraordinarily large check that is inconsistent with historical patterns is presented for payment.

In yet another example embodiment, the historical activity attribute is an average annual activity attribute, wherein the average annual activity attribute has a value of from about 0% to about 100%, the value being proportional to the magnitude of the difference between the payment amount of the check and the average payment amount of previously paid checks for the account number during one or more preceding years or one or more preceding years to date.

In yet another example embodiment, the historical activity attribute is a total annual activity attribute, wherein the total annual activity attribute has a value of from about 0% to about 100%, the value being proportional to the magnitude of the difference between the payment amount of the check and the total payment amount of previously paid checks for the account number during one or more preceding years or one or more preceding years to date.

In still another example embodiment, the historical activity attribute is an average quarterly activity attribute, wherein the average quarterly activity attribute has a value of from about 0% to about 100%, the value being proportional to the magnitude of the difference between the payment amount of the check and the average payment amount of previously paid checks for the account number during one or more preceding quarters or one or more preceding quarters to date.

In another embodiment, the historical activity attribute is a total quarterly activity attribute, wherein the total quarterly activity attribute has a value of from about 0% to about 100%, the value being proportional to the magnitude of the difference between the payment amount of the check and the total payment amount of previously paid checks for the account number during one or more preceding quarters or one or more preceding quarters to date.

In another embodiment, the historical activity attribute is an average monthly activity attribute, wherein the average monthly activity attribute has a value of from about 0% to about 100%, the value being proportional to the magnitude of the difference between the payment amount of the check and the average payment amount of previously paid checks for the account number during one or more preceding months or one or more preceding months to date.

In another embodiment, the historical activity attribute is a total monthly activity attribute, wherein the total monthly activity attribute has a value of from about 0% to about 100%, the value being proportional to the magnitude of the difference between the payment amount of the check and the total payment amount of previously paid checks for the account number during one or more preceding months or one or more preceding months to date.

In another embodiment, the historical activity attribute is an average biweekly activity attribute, wherein the average biweekly (14 day) activity attribute has a value of from about 0% to about 100%, the value being proportional to the magnitude of the difference between the payment amount of the check and the average payment amount of previously paid checks for the account number during one or more preceding biweeks or one or more preceding biweeks to date.

In another embodiment, the historical activity attribute is a total biweekly activity attribute, wherein the total biweekly activity attribute has a value of from about 0% to about 100%, the value being proportional to the magnitude of the difference between the payment amount of the check and the total payment amount of previously paid checks for the account number during one or more preceding biweeks or one or more preceding biweeks to date.

In another embodiment, the historical activity attribute is an average weekly activity attribute, wherein the average weekly activity attribute has a value of from about 0% to about 100%, the value being proportional to the magnitude of the difference between the payment amount of the check and the average payment amount of previously paid checks for the account number during one or more preceding weeks or one or more preceding weeks to date.

In another embodiment, the historical activity attribute is a total weekly activity attribute, wherein the total weekly activity attribute has a value of from about 0% to about 100%, the value being proportional to the magnitude of the difference between the payment amount of the check and the total payment amount of previously paid checks for the account number during one or more preceding weeks or one or more preceding weeks to date.

In another embodiment, the one or more attributes comprise a payment amount limit attribute, wherein the payment amount limit attribute has a value of 100% when the payment amount is equal to or exceeds a predetermined maximum payment limit, or 0% when the payment amount less than a predetermined maximum payment limit. By configuring this attribute, a bank may impose a limit on the size of a check that may be paid on an account.

In another embodiment, the one or more attributes comprise a foreign account attribute, wherein the foreign account attribute has a value of greater than about 0% when the bank holding the account against which the check is drawn is foreign to the commercial paper cashing agent, or 0% when the bank holding the account against which the check is drawn is not foreign to the commercial paper cashing agent. Likewise, in yet another embodiment, the foreign account attribute may have a value of greater than about 0% when the bank holding the account against which the check is drawn is out-of-state with respect to the commercial paper cashing agent, or 0% when the bank holding the account against which the check is drawn is not out-of-state with respect to the commercial paper cashing agent.

Referring to the drawings, typical components of an example commercial paper fraud detection system are illustrated in FIG. 1. The system includes a nightly process 104, which refreshes each customer account in a database 110. Customer accounts contain information pertaining to checks that were processed and statistical data associated with each account, including check number, processing date, check amount, and check payment location, as well as other input from the bank computer and data systems 102. In an example embodiment, two processes are executed each night.

Still referring to FIG. 1, in an example embodiment, a "refresh" process takes input from customers and populates the database 110 with any account activity. The application may access a common server and retrieves daily refresh data from the bank. Such data are typically stored in a file. The contents of the file may be ASCII or XML. If the file exists, it will be processed; otherwise the refresh process assumes no activity. With this design, holiday and weekend processes can still execute the nightly process without error. The refresh process uses a database design that defines how to process the file; therefore the file can be in any format. This gives the product the flexibility to process multiple file formats from the same bank or different formats for multiple banks. A configuration tool enables the administrator to configure the database for any input structure. The second process is the "update statistics" process, which updates customer account summary sheet to reflect any changes to the account. The process resets any flags that are used by the CPFDS to validate same day check cashing. The process updates the forecasted next check number. The process also updates the customer account check habits database table. Account information is available to a user (e.g., a bank teller or a merchant) via a user interface 120 component. In order to determine if a check being processed has the probability of being fraudulent, check data are entered using the user interface 120, which may include manual entry by a human operator or automated entry by, e.g. an optical scanning device (not depicted). The update statistics process also sets the forecast next check number field for new accounts to the current check number plus the offset defined in the system defaults table. This will allow the system to handle new accounts or accounts that have no historical data. The process can be executed manually or launched from a scheduler. If the process is launched from a scheduler, a shortcut can be configured to pass the group code. In this mode of operation, error messages generally do not halt execution with message boxes. Any errors that occur are logged to a file.

Still referring to the example embodiment of FIG. 1, the user interface 120 provides means for collecting an account number, check number, and check amount from an input device in order to validate the probability of fraudulence. An example user interface 120 is a personal computer terminal located at a bank teller's work area. The system uses configurable attributes to predict fraud. An attribute is a rule applied by the CPFDS to determine the probability that a check is fraudulent. In an embodiment, the user interface 120 may display all the attributes that are checked. The system supports multiple account types, e.g. business, personal, etc. This design allows different attributes to be associated to different account types. Each attribute is assigned a probability seed value. The total of all seed values may be equal to 100% (or even greater than 100% in some embodiments). The cumulative value of the failed attributes (that is, attributes having higher values, e.g. 100%) may be displayed for the end user and a configurable message assigned to each failed (high) attribute. The operator may then use this information to determine the appropriate action. The user interface 120 allows the operator to select a configurable location code where the check is being cashed. The location code can be defined as a branch location, district, or state. A default setting is used to select the current location code. When the operator cashes the check, the account is updated. If any attribute failed during validation (e.g., is greater than a predetermined threshold value), the activity will be stored in a special audit table. This table can be used for reporting 130. If the operator cashed the check, the system will update the database 110. The system can be configured to send a notice in the form of an email to a defined set of email addresses when a check is cashed with a fraudulent probability or risk indicator higher than a set amount. These notices can be sent in real time, daily, weekly, bimonthly or monthly. These features are set using the configuration management tools 140.

As the base of users of the fraud detection system grows, the database 110 for comparison increases and the ability to rapidly adapt the system to changing fraudulent practices is enhanced. For example, if institutions are spread over a geographical area and are networked in the system, when a criminal propagates a fraud scheme with characteristic feature Q in geographical area A and then moves to geographical area B, detection of the potential of fraud characterized by feature Q is readily detectable by the system in area A and area B even though the criminal has never been in area B before.

Also as depicted in FIG. 1, the system may also include manuals 150, which describe to the operator how to use the user interface and configuration management tool. An installation application may also provide installation software 160, which is used to install the product on a client computer. For example, it creates the directories where the software program instructions reside. The database connectivity client may also be configured by the installation software 160. The reporting module 130 may provide information to be used by the client to fine tune the system and perform internal auditing. For example, reports allow the user to select a range of dates and locations. An activity summary report may provide the following information for the time period chosen by the user: total number of checks processed, total dollar amount of checks processed, total number of checks cashed, total dollar amount of checks cashed, total number of checks rejected, total dollar amount of checks rejected, total number of suspect checks, and total dollar amount of suspect checks, among others. Likewise, an activity detail report may provide the following information for each check during the time period chosen by the user: all checks processed, check amount, check number, date, user id, suspect checks cashed, percent suspect, suspect messages, and suspect checks not cashed, among others.

Figure 2:
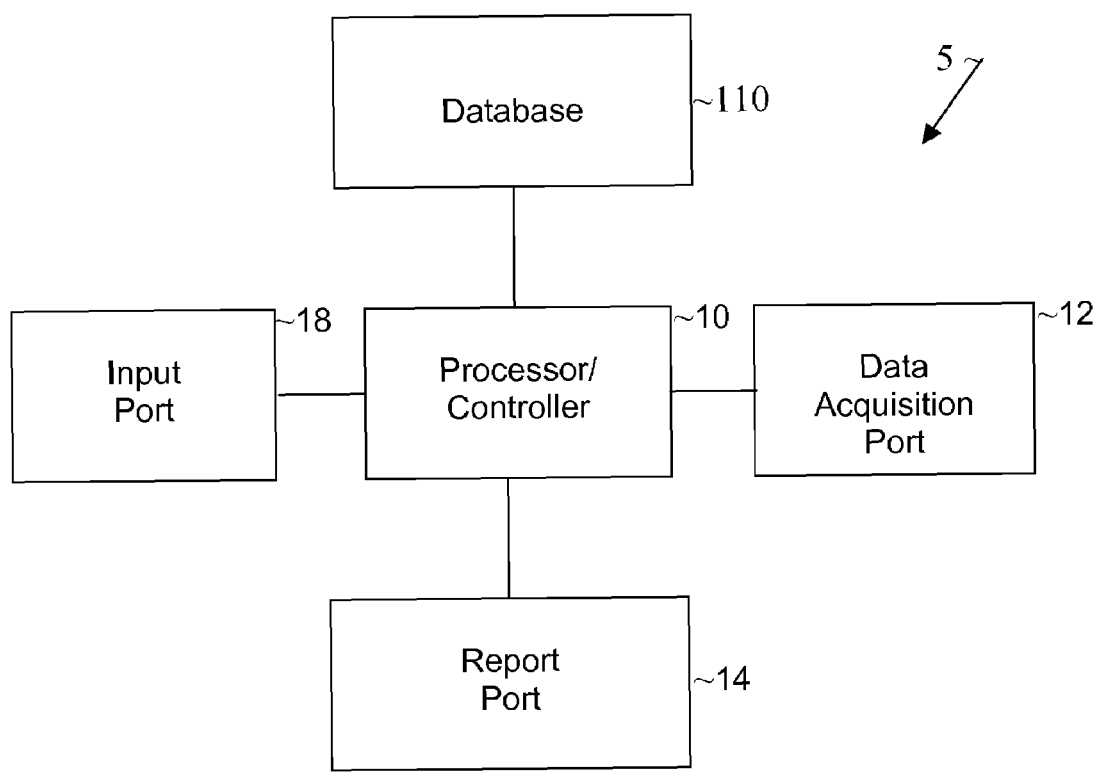

Referring to FIG. 2, some basic elements of a commercial paper fraud detection system 5 includes a processor/controller 10, a data acquisition port 12, a reporting port 14 and input port 18 and a database 110. The processor/controller 10 includes the capability to communicate with the data acquisition port 12, the reporting port 14 and the input port 18, and the capability to process data. Data processing capability includes algorithms that can compare data from a database with data obtained from a check presented for payment and score the comparison. The system further includes a data acquisition port 12 for collecting data from a check presented for cashing. The data acquisition port 12 may, for example, collect data by scanning the check, by operator input of selected data or some combination thereof. A predetermined data set may be collected or alternatively data may be collected generally and predetermined data selected from the generally collected data for comparison. Data acquired at the data acquisition port is transmitted to the processor/controller 10 for processing. The report port 14 provides a report to the financial institution to which the check is presented as to whether any evidence of fraud is identified. The report port 14 may be stand alone or integrally connected to the data acquisition port 12. The report may be presented as a sound signal, a light signal, a message on a terminal screen, a print out or some combination thereof, for example. The database 110 stores data. The stored data may include, but is not limited to, account information, check numbers used, transactional history for a particular account, characteristic features related to identified scams, and the like. Exemplary characteristic features associated with scams may include, but are not limited to, physical features such as method of alternating payee names, accounts numbers and the like, or behavior patterns such as, for example, location or time of cashing.

Still referring to FIG. 2, the commercial paper fraud detection system may also include an input port 18. For example, the input port 18 may be accessed by a system manager and provide the system manager access to the system to modify the type of data selected to be compared or to modify algorithms or the scoring process to enhance the efficiency of the process. The ability to modify the type of data selected for comparison by the algorithms and scoring may be particularly useful in facilitating dealing with new scams that are identified. Alternatively the input port 18 may be used to scan information from checks which are confirmed to be fraudulent upon investigation into the system and a neural network may be employed to facilitate enhancing the capability of the system to screen for fraud. In some embodiments, a combination of manual and machine input may be used.

Figure 3:
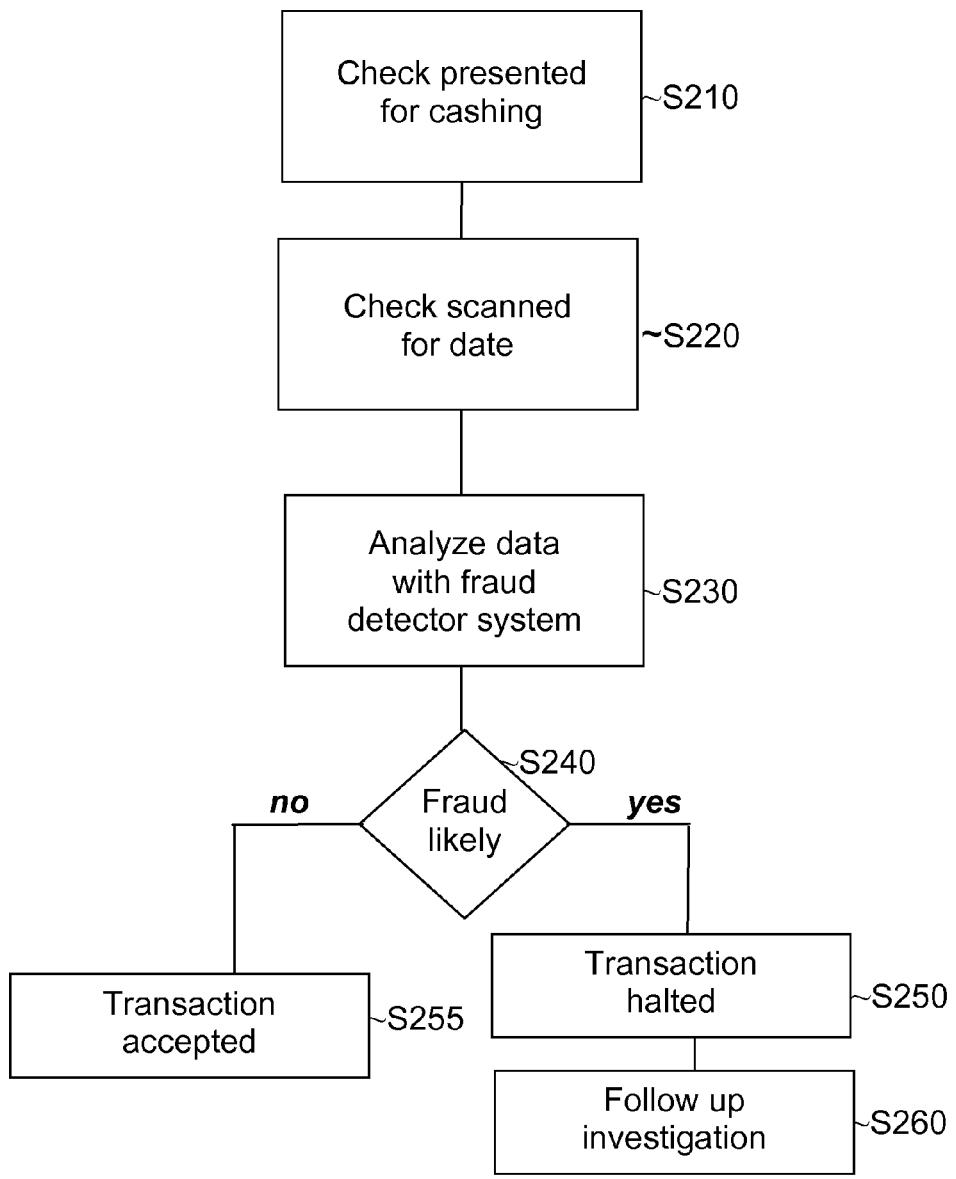
FIGS. 3-4 illustrate steps of example transactions according to a commercial paper fraud detection system according to an embodiment of the invention.

FIG. 3 is a diagram of an exemplary transaction using a commercial paper fraud detection system from the perspective of the check cashing agent. A check is presented for cashing in a conventional manner S210, the check is scanned for data S220 in a scanning device (i.e., data acquisition port 12) located at the site of presentment. For example, if the check was presented at a bank, it would be scanned at the teller's window immediately upon presentment. The scanner may be configured to acquire predetermined types of information such as account number and or check number for example or the scanner may generally image the check with predetermined selected information being extracted from the data set during processing. Alternatively, in another embodiment a teller may manually enter pre-selected data into the system via the data acquisition port 12. The predetermined selected information collected from the check is processed by the fraud detection system S230. Processing comprises the processor/controller applying algorithm(s) to compare the collected predetermined selected information from the check to database information and score the results of the comparison. Predetermined threshold levels for scores are the basis for assigning a designation of whether fraud is likely. Whether fraud is likely or not S240 is reported to the person processing the check for cashing through a sound signal, a light signal, a computer screen message, a printout, or the like.

Still referring to FIG. 3, scanning a check S220 and analyzing the data with a commercial paper fraud detection system to yield a risk indicator (likelihood of fraud) score S230 and the generation of the report of whether fraud is likely S240 may be accomplished very rapidly. According, if the system does not detect any evidence of fraud, the transaction is accepted S255 and the customer presenting a check for cashing should not experience any substantial delay in receiving payment as compared to cashing a check in the absence of the fraud detection system 5. If analysis with the fraud detection system 5 provides a report S240 that fraud is likely, the transaction is halted S250, and a follow-up investigation S260 is initiated. The follow-up investigation S260 may include basic steps by the person processing the check to assess the potential for a mistake or detailed investigation by security or law enforcement personnel. Obviously, an individual attempting to cash a check that shows evidence of fraud may be denied the privilege of cashing the check for at least a period of time. Such screening at the time of presentment facilitates halting fraud before payment is made, and may also facilitate law enforcement's ability to apprehend suspects perpetrating fraudulent scams. The commercial paper fraud detection system 5 may be established for a single institution but it is preferable to apply the system to a network of check cashing agencies. The network may include multiple branches of a single institution, a group of institutions in the same business sector (e.g., a plurality of different banks or financial institutions, for example) or a network of check cashing agents (e.g., a network including banks, merchants or government agencies, for example.)

Figure 4:
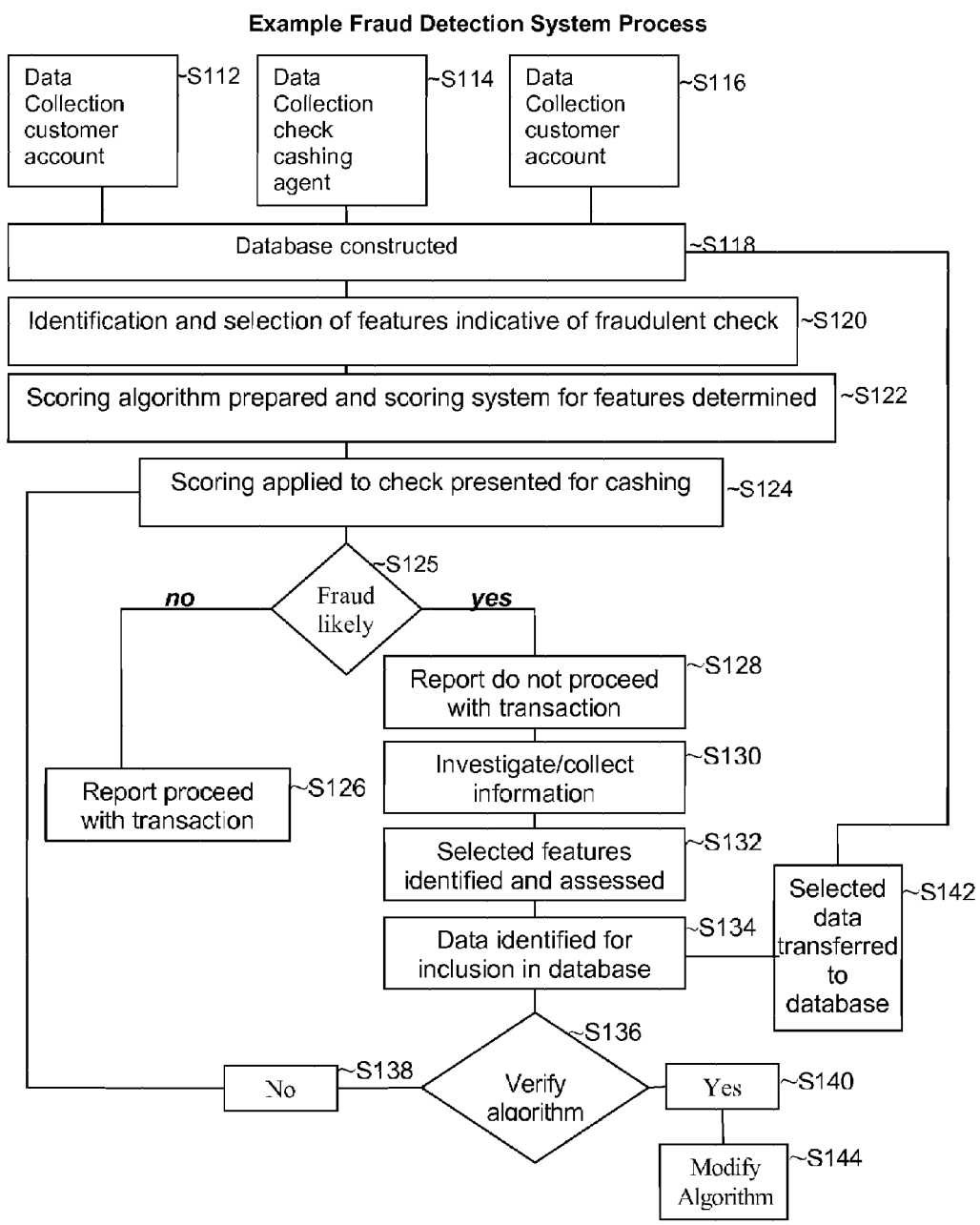

The commercial paper fraud detection system process is implemented by constructing a database 110 and algorithms for comparing database 110 information with information related to checks presented for payment. Referring to FIG. 4, the process includes the steps of collecting data regarding customer account S112 including account history, collecting data from check cashing agents S114 and collecting data from law enforcement related sources S116 and constructing a database S118. Customer account information may include, for example, check number used, account number, or transaction history. Preferably, the customer account information is collected in a manner that is transparent to the account owner. Namely, the account owner does not have to follow any special procedures or take any additional steps beyond those conventionally associated with paying for goods and services with checks. Financial institution information any include, for example, account information or markers identified by the institution previously as characteristic of fraud. Information obtained from law enforcement may include known scam patterns or fraud markers identified previously.

Once constructed, the database S118 can be mapped and fraud indicator attributes selected and assigned values S120. This may be done manually, by using computer algorithms or a combination thereof. Examples of attributes that may be selected include, but are not limited to, a check number out of sequence, account numbers, account holders, the check number, state of origin of the check, state of presentment of the check, and history of check numbers used. At least one factor must be selected. In some exemplary embodiments a plurality of factors are selected. For example, the system may use nightly algorithms to build predictive models of customer spending. It may compare a check being presented to the teller/point of contact with these habits to determine suspicious level.

An algorithm or plurality of algorithms compare the selected attributes of the database 110 with selected attributes of the check presented for cashing S122. A score is assigned to the check presented for cashing S124. The score serves to indicate the potential for possible fraud. If the score does not meet a threshold to suggest fraud S125, a report is issued S126 that the transaction may proceed. If the score exceeds a threshold that suggests fraud S128, the report notifies the check cashing agent of the need to investigate before proceeding with the transaction S128 and the transaction is halted before any funds have been transferred.

In an embodiment, the system is not intended to make the ultimate judgment as to whether a check is fraudulent but rather to screen checks to alert staff of the need to investigate contemporaneously with the presentment of a check for payment. Further, it is not necessary that the account holder provide any additional information other than the information conventionally on a check to a bank or make any special arrangement to transmit additional information to the bank proximate to the time that the check is written. Thus, initial screening can be accomplished in a manner that is transparent to the account holder.

Figure 5:
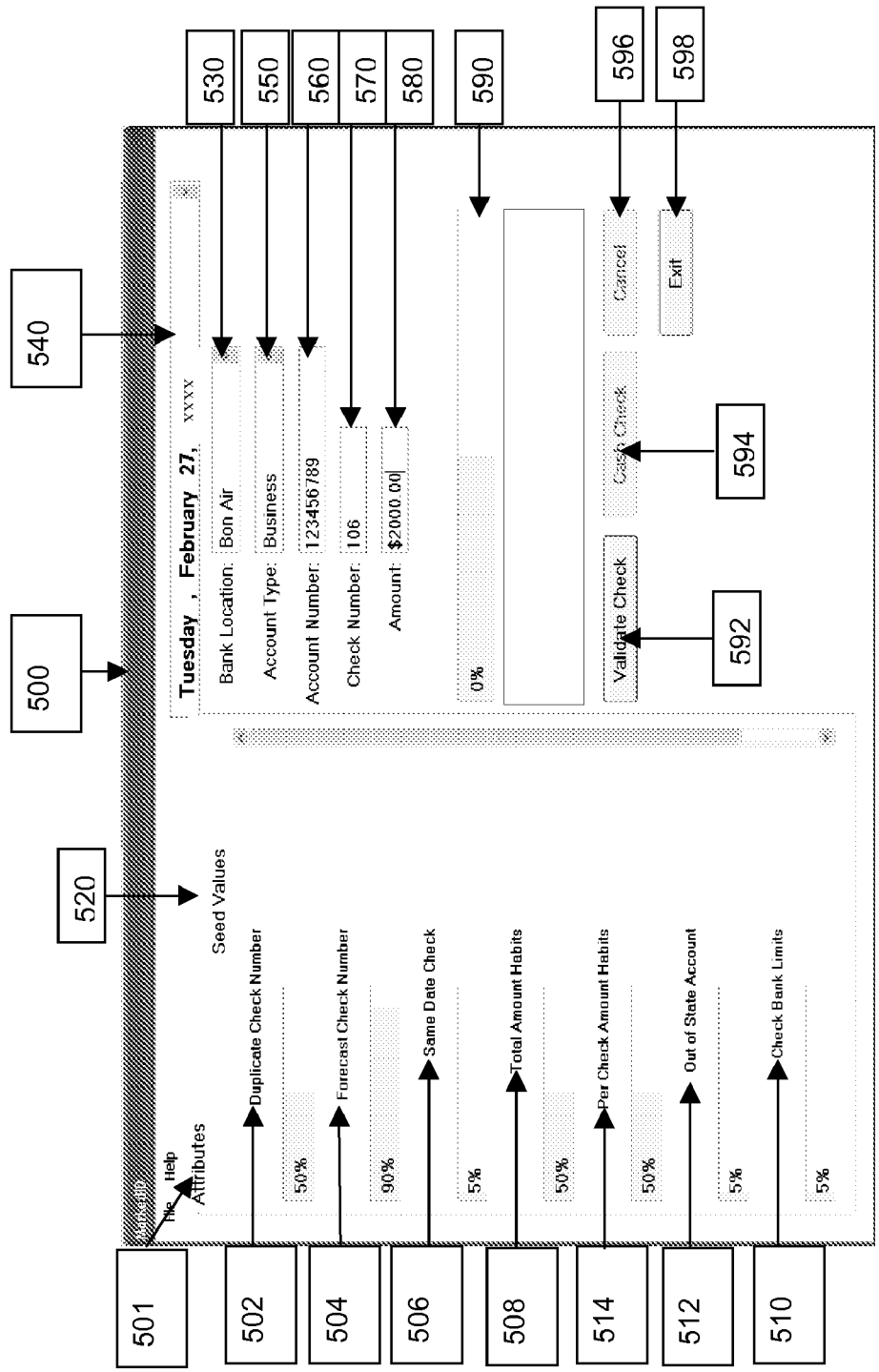
FIGS. 5-7 illustrate example graphical user interfaces of an embodiment of the invention.

Still referring to the example embodiment of FIG. 5, if screening indicates that fraud is likely S128, the check cashing agent is notified. The check cashing agent initiates an investigation and collects additional information S130. Typically this investigation would be conducted by conventional means, by the check cashing agents' representative, a security officer or law enforcement officers. If the suspicion of fraud is substantiated, the check cashing agent or law enforcement official would take actions consistent with conventional policy or laws. In an exemplary embodiment, information obtained from the investigation is assessed S132 for system enhancement. Both facts associated with false positive and facts associated with checks identified to be fraudulent may be useful data for refining and improving the fraud detection system. Data determined to be useful for refining and improving the system is identified for inclusion is the database S134. The selected data is transferred to the database S142.

Optionally, need to revise the algorithms can be assessed S136 as results from screening of checks and subsequent investigation or new factors for recognizing potential fraud are identified from external sources. If no need to revise the algorithms is identified S138, the existing algorithm(s) continue in use. If it is determined to be desirable to modify the algorithms S140, the algorithm(s) may be modified manually by input from a systems manager/programmer, via an automated neural network mechanism or a combination thereof. Once modified the modified algorithm may be applied to checks presented for cashing S124.

FIG. 5 illustrates an example software implementation of an embodiment of the invention. A graphical user interface (GUI) 500 permits the a merchant or bank teller to enter information about a check presented for payment. Data are entered by drop-down menus and check boxes, among other means. The system calculates the risk indicator based on the data, as described herein. The risk may be used in evaluating the likelihood that a check presented for payment is fraudulent. The attributes 501 include a duplicate check number attribute 502, a forecast check number attribute 504, a same date check attribute 506, a total amount habit attribute 508, a check bank limit attribute 510, an out-of-state account attribute, and a per check amount habit attribute 514, each having various seed values 520. The seed values 520 are proportional to the relative contribution that each attribute makes in the calculation of the risk indicator value 590 for a check. The graphical user interface 500 includes a location drop down menu 530, according to which the bank branch office is identified, a date drop down menu 540, an account type drop down menu 550 (e.g., business or personal checking account), an account number text box 560, a check number text box 570, and a check amount text box 580. After entering the location, date, account type, account number, and check number information in the appropriate locations, the merchant or teller clicks on the validate check button 592, whereupon a risk indicator value is calculated. The operation may be cancelled by clicking on the cancel button 596, or the entered information may be cleared by clicking on the clear button 595. After a check has been validated, and if the risk indicator value is within permissible limits, the check may be cashed by clicking on the cash check button 594.

Figure 6:
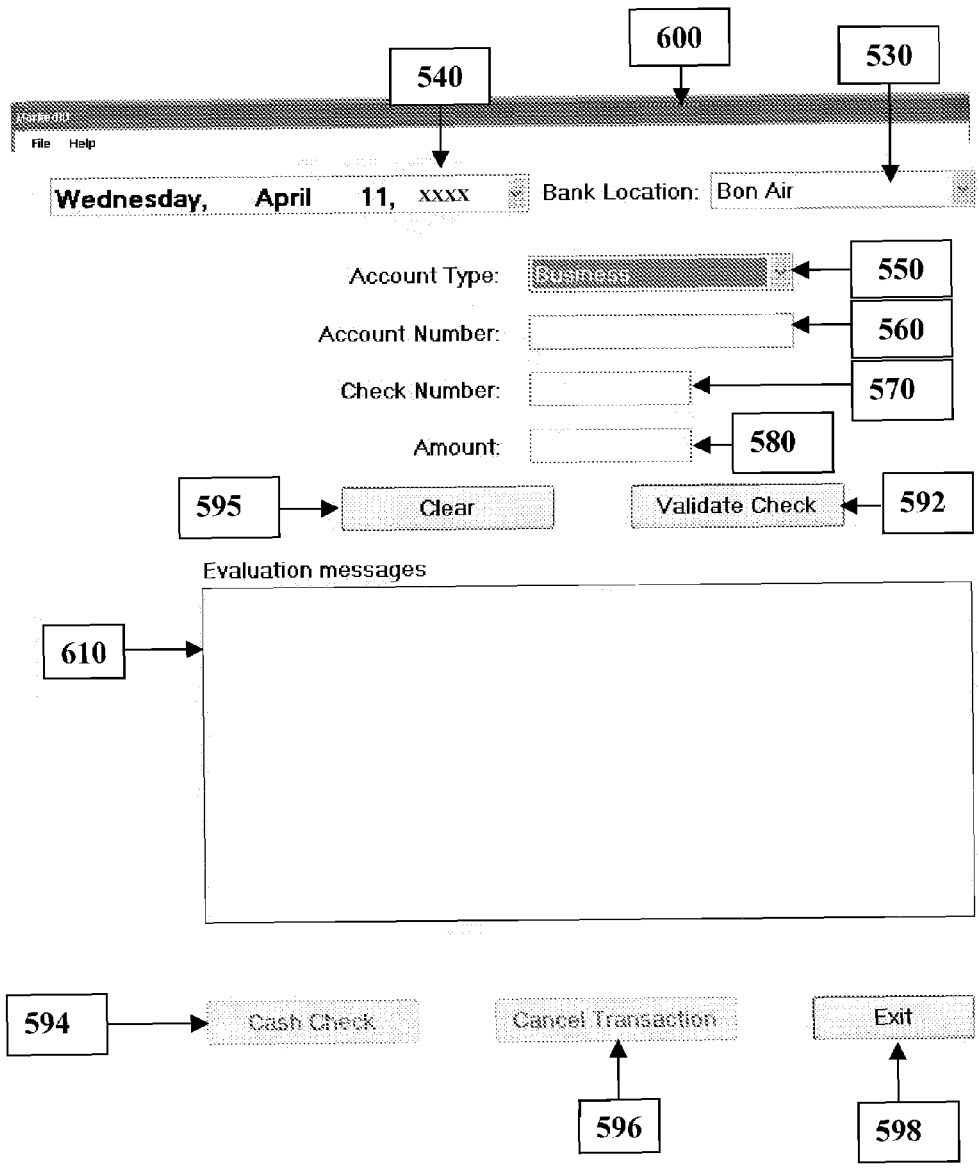
Figure 7:
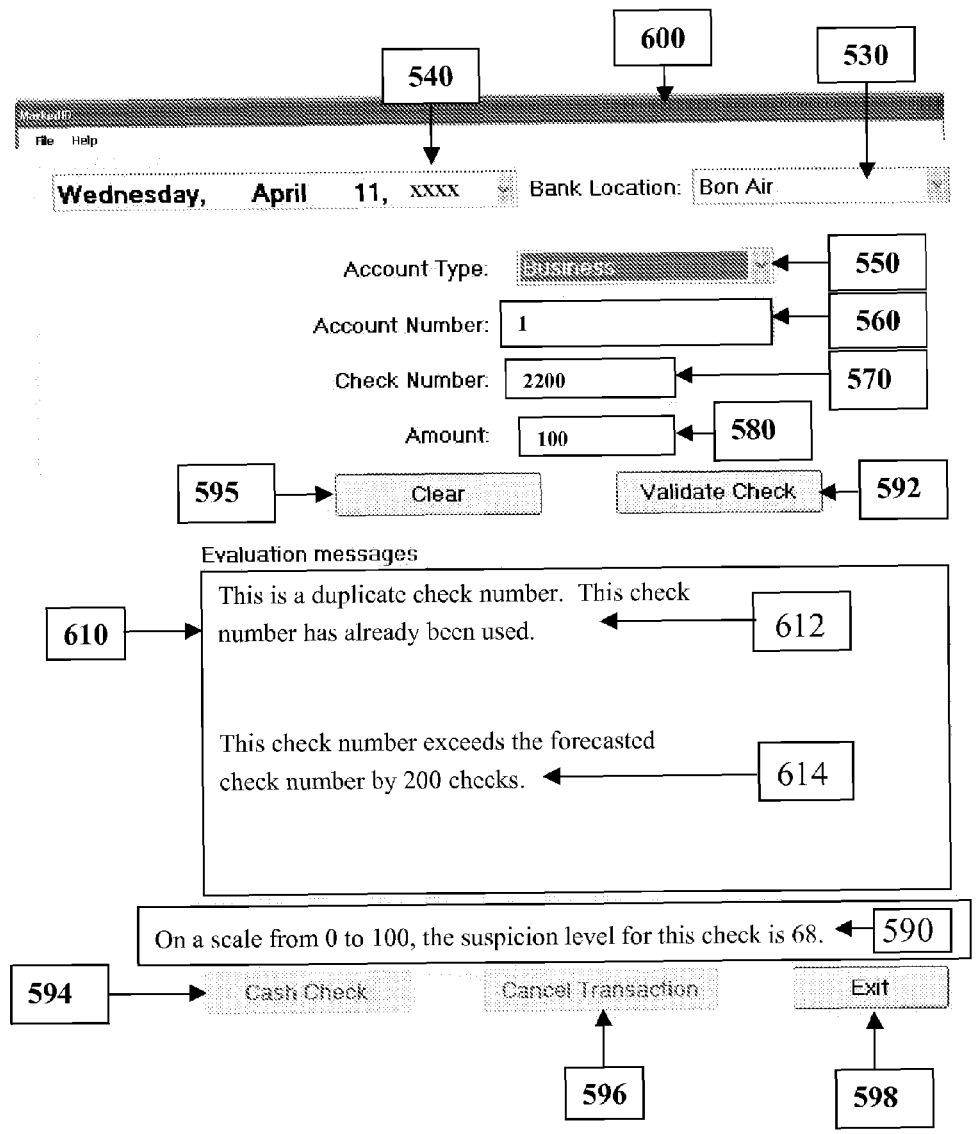

The graphical user interface 500 depicted in FIG. 5 provides more information that may be necessary or appropriate for a bank teller or merchant. For example, the seed values 520 may not be of interest to a bank teller, who is typically only interested in whether or not a check should be cashed. Nevertheless, the graphical user interface 500 of FIG. 5 may be of interest to bank administrators or software developers who are interested in the quantitative information provided therein. FIG. 6 illustrates a simplified graphical user interface 600, which includes a warning message window 610. In like manner as described hereinabove with respect to FIG. 5, data pertaining to a check presented for payment are entered in the appropriate locations in the graphical user interface 600. Clicking on the validate check button 592 provides the bank teller with information in the warning message window 610, as illustrated in FIG. 7. Two example warning messages 612, 614 are shown, as well as the risk indicator value 590.

Figure 8:
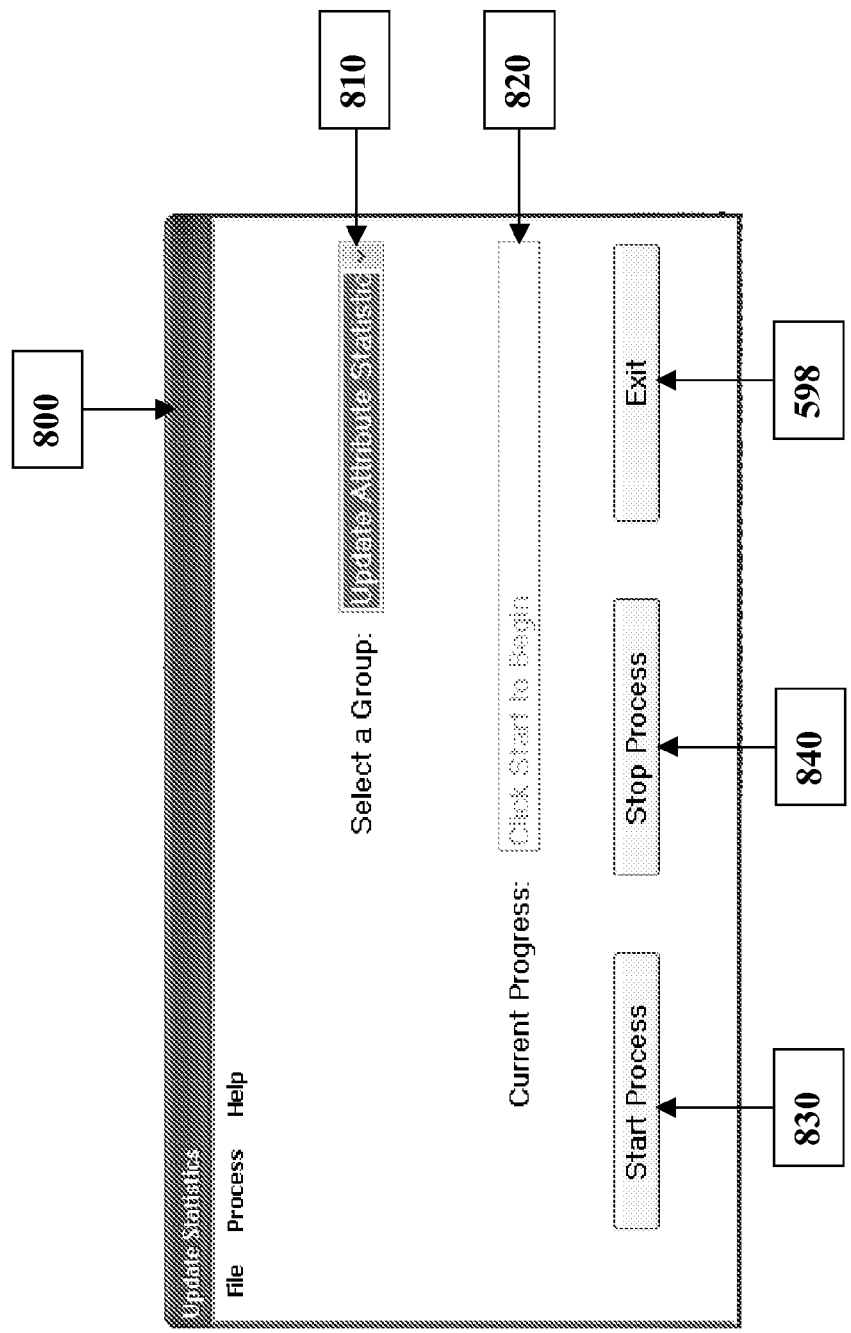
FIG. 8 illustrates example means for updating the statistical database according to an embodiment of the invention.
Figure 9:
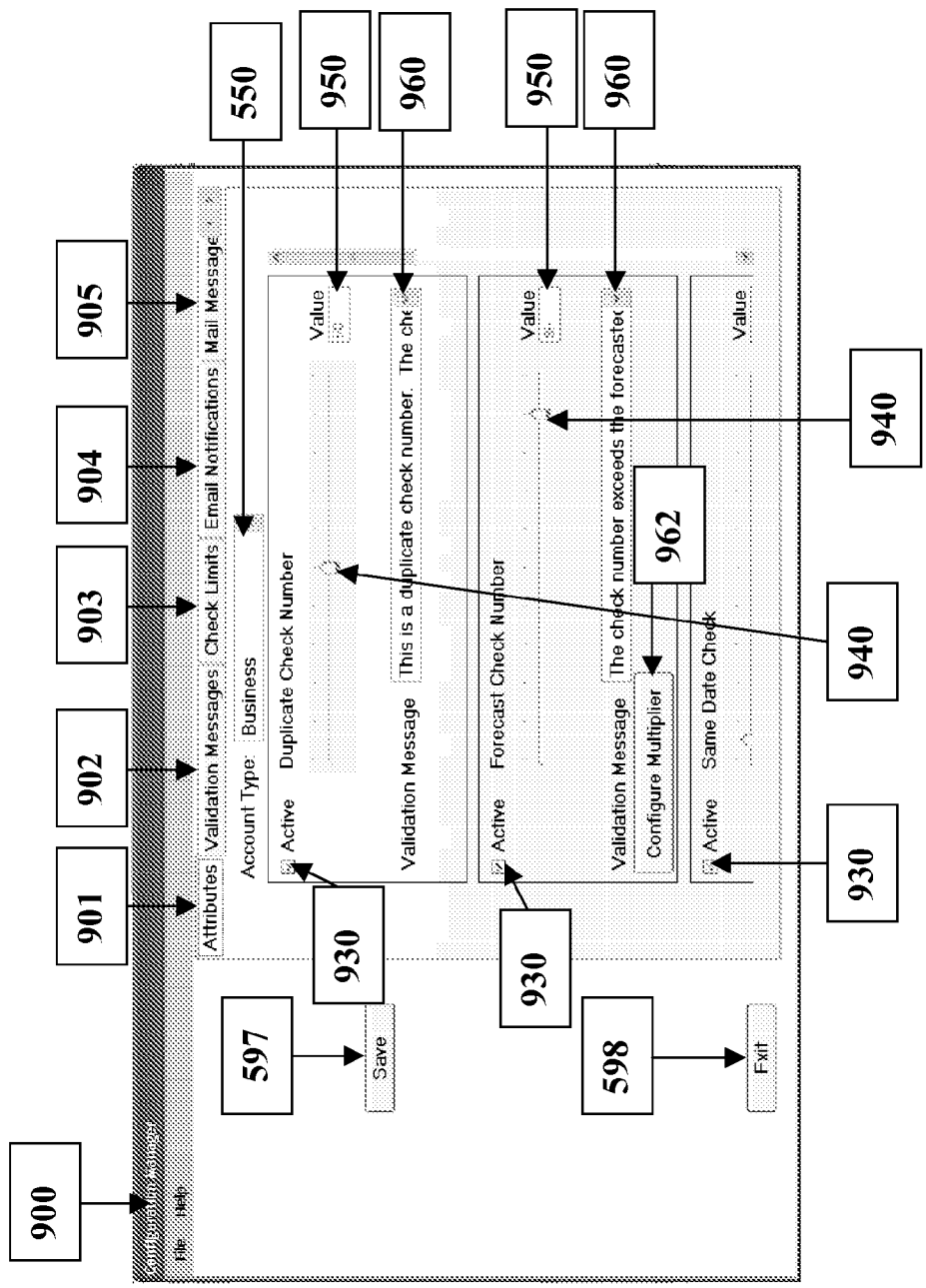
FIGS. 9-15 illustrate example graphical user interfaces for configuring an embodiment of a commercial paper fraud detection system.

Although attribute statistics will often be updated automatically, the update statistics process may be launched manually by clicking on the start process button 830 in an update statistics graphical user interface 800 as illustrated in FIG. 8. The progress of the update process is illustrated in a progress indicator 820. The type of update to be conducted may be selected using an update process dropdown menu 810. If the update process is to be terminated prematurely, the stop process button 840 may be clicked. An exit button 598 is also provided.

Referring to FIGS. 9-15, a configuration manager graphical user interface 900 allows a system administrator to configure the attributes used in the evaluation of checks and the calculation of a risk indicator value according to an example embodiment of the invention. The system is preconfigured for supported attributes. The attributes tab 901 (FIG. 9) is used configure the seed value of each attribute, activate or deactivate the attribute (using a check box 930 to activate the attribute), configure the multiplier (using a configure button 962) according to which various attributes may be sub-weighted, and change the validation message 960 that is displayed when the attribute fails. The relative contribution of an attribute to the calculated risk indicator is set using either a slide bar selector 940 or by entering a numerical value in the attribute value text box 950. Although all of the attributes are not depicted in FIG. 9, there may be as many as 20 or more configurable attributes. Changes in the configuration settings may be saved by clicking on a save button 597.

Figure 10:
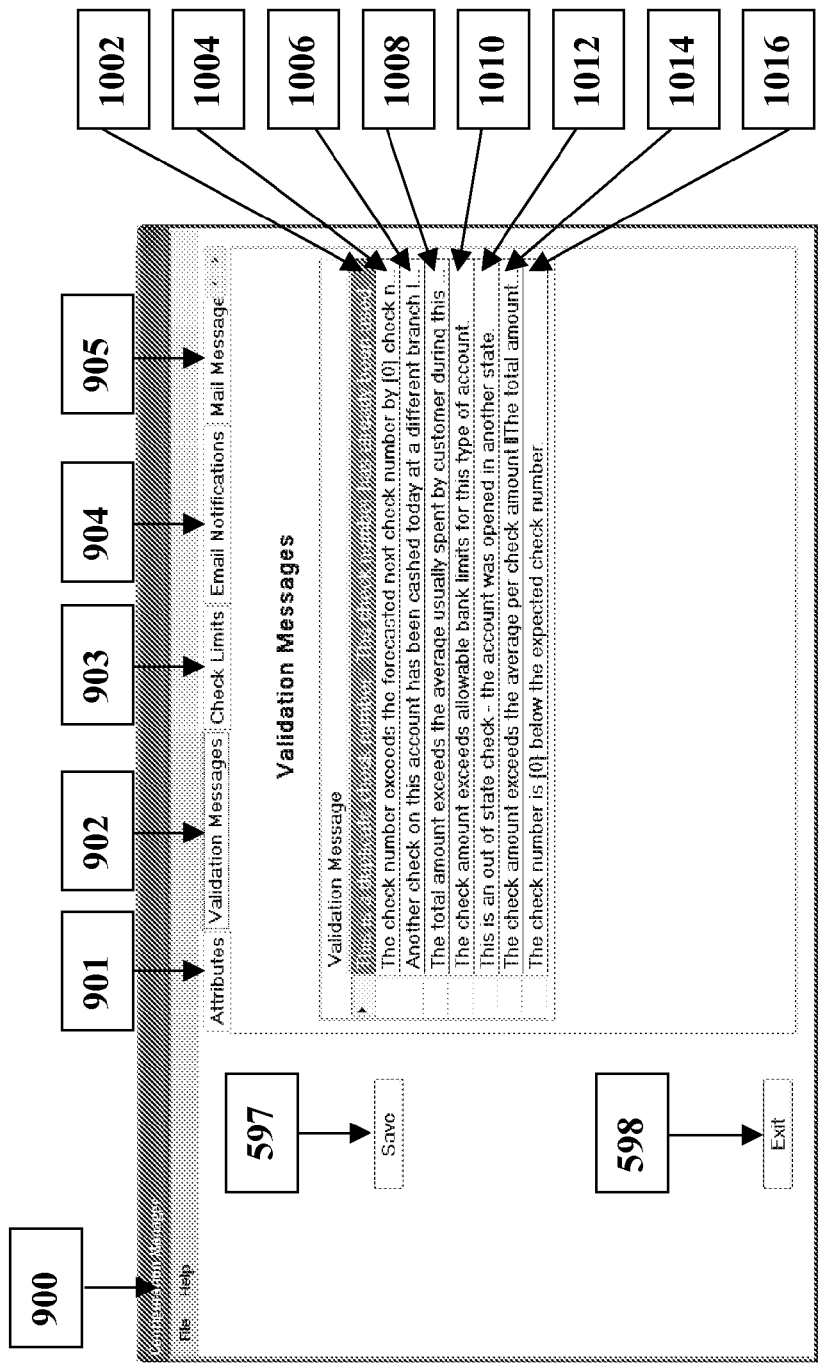

A commercial paper fraud detection system uses a variety of attributes to determine the probability that a check being presented for payment is fraudulent. These attributes are weighted by relative importance. The weight of each attribute is configurable by the type of account (selected by a drop down menu 550) and is set according to the requirements of each bank. Each attribute is evaluated and the weights of the attributes that fail (e.g., that have a high value) are added to give a total probability of fraud, i.e., the risk indicator 590 value. Each of the attributes may be configured by the system administrator in accordance with the business and security objectives of the bank's management. When a check is evaluated, the graphical user interface 500, 600 displays the total probability that the check is fraudulent as a risk indicator 590 and the associated messages 960 for each attribute that failed validation (e.g., is greater than a predetermined threshold value). The options presented in the validation message drop down menu 960 may be configured, as illustrated in FIG. 10, by selecting the validation messages tab 902 in the configuration manager graphical user interface 900. Several optional validation messages (1002, 1004, 1006, 1008, 1010, 1012, 1014, 1016) are illustrated in FIG. 10.

During system operation, the user may choose to cash the check or cancel a transaction. According to an example embodiment, if the operator cashes the check and the fraudulent probability is over 0%, the system logs this transaction in a suspect check table. Such data may be used to evaluate system performance and refine the weights for the attributes. If the operator cancels the transaction, the system logs this as a suspect check that was not cashed. These data allow the bank to evaluate the cost savings of the system and to measure other metrics. The system provides a mechanism to force the rejection of a check if the probability is greater than a predefined value, which is configurable based on account type so each type of account can have a different threshold. If the system evaluates the check to a probability above the predetermined value, the operator can only cancel the transaction. The transaction is logged as a check that was not cashed.

Figure 11:
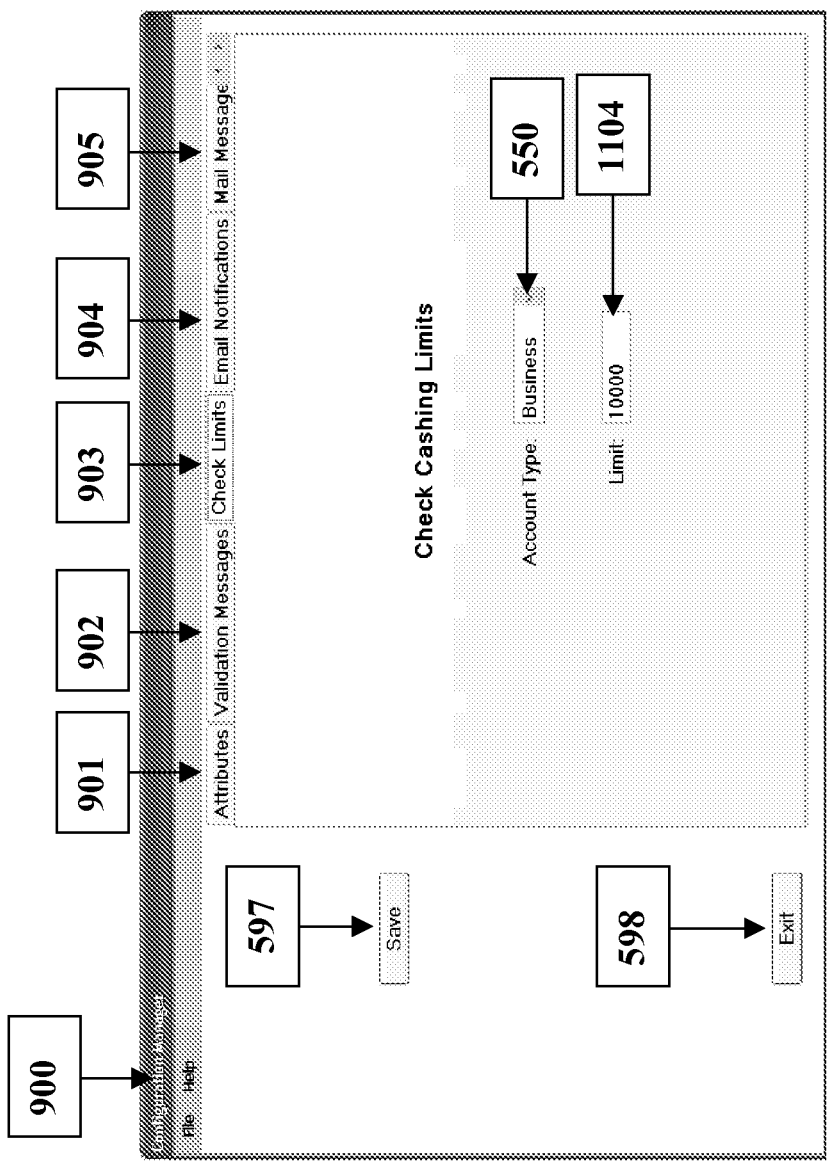
Figure 12:
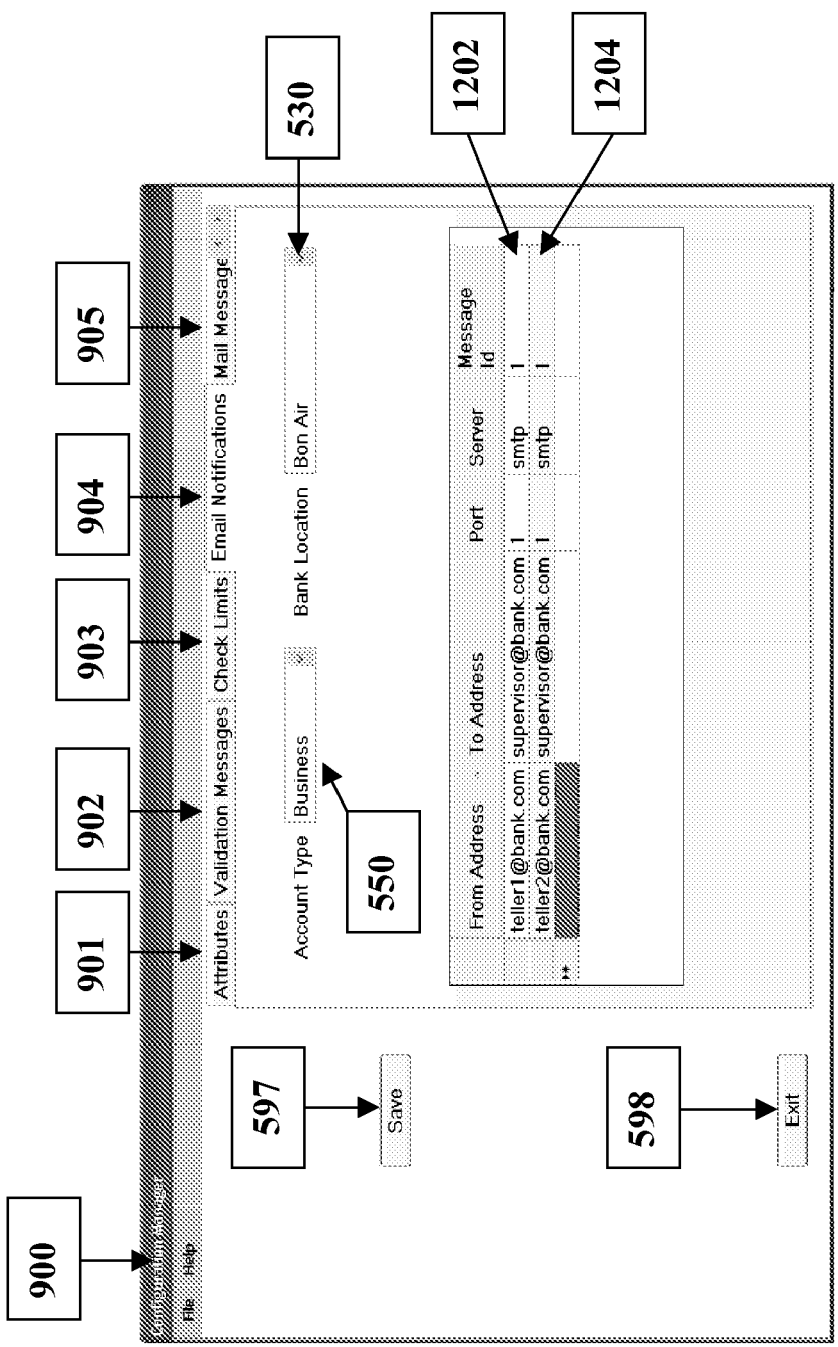

Referring to FIG. 11, the check limits tab 903 of the configuration manager graphical user interface 900 is provided to allow the bank to set the limits for the amounts a check can be cashed for by each account type. The daily amount of money is entered in an account limit text box 1104 for each account type, which is selected using an account type drop down menu 550.

Figure 13:
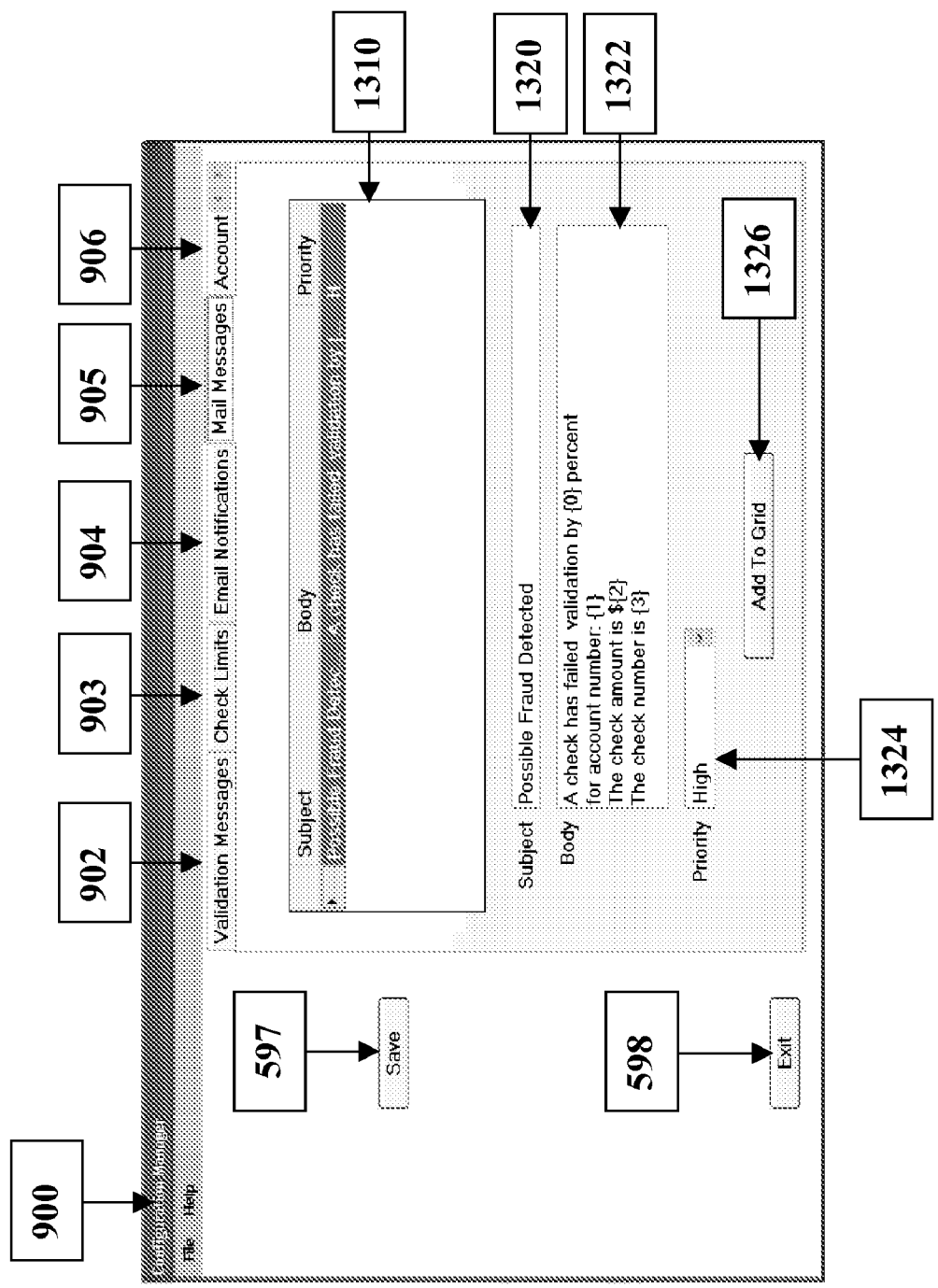
Figure 14:
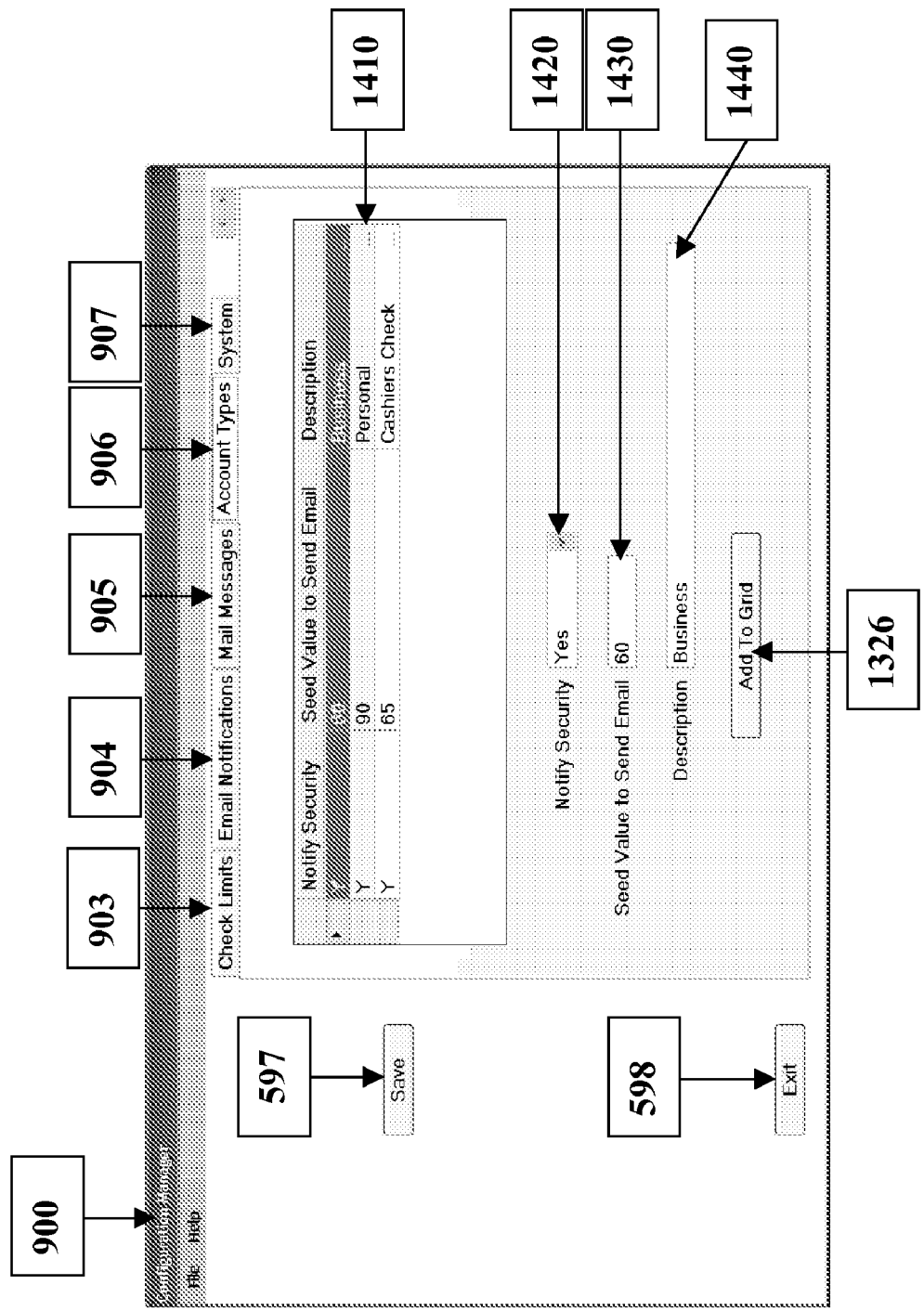

The system may also provide a mechanism to automatically send email notifications to security, branch managers, and similar personnel upon cashing of a suspect check. The subject line, recipient, body and priority of the email notifications are also configurable as illustrated in the email notification tab 904 shown in FIG. 12. The system may be configured to send the email to or from several recipients 1202, 1204. This email notification feature can be turned on or off for individual locations and account types, and each location and account type combination can be configured to send emails to multiple people. Referring to FIG. 13, the email message content that is sent when a suspect check is cashed is configured on the mail messages tab 905 of the configuration manager graphical user interface. The system may come preconfigured with a default message 1310, which includes a subject line 1320 and an email template body 1322, as well as a priority selected from a drop down menu 1324. Other email messages may be configured and added (using the add button 1326). By selecting the account type tab 906 of the configuration manager graphical user interface illustrated in FIG. 14, a system administrator may define the email criteria for various account types. These account types allow the system to treat accounts differently based on the attributes defined for the account type. A system administrator may add additional email notification criteria by entering the trigger seed threshold value in text box 1430, selecting whether or not to notify security using drop down menu 1420, and entering the account type or description in description text box 1440. The account type is added to the list of account types and email criteria 1410 by clicking on the add button 1326.

Figure 15:
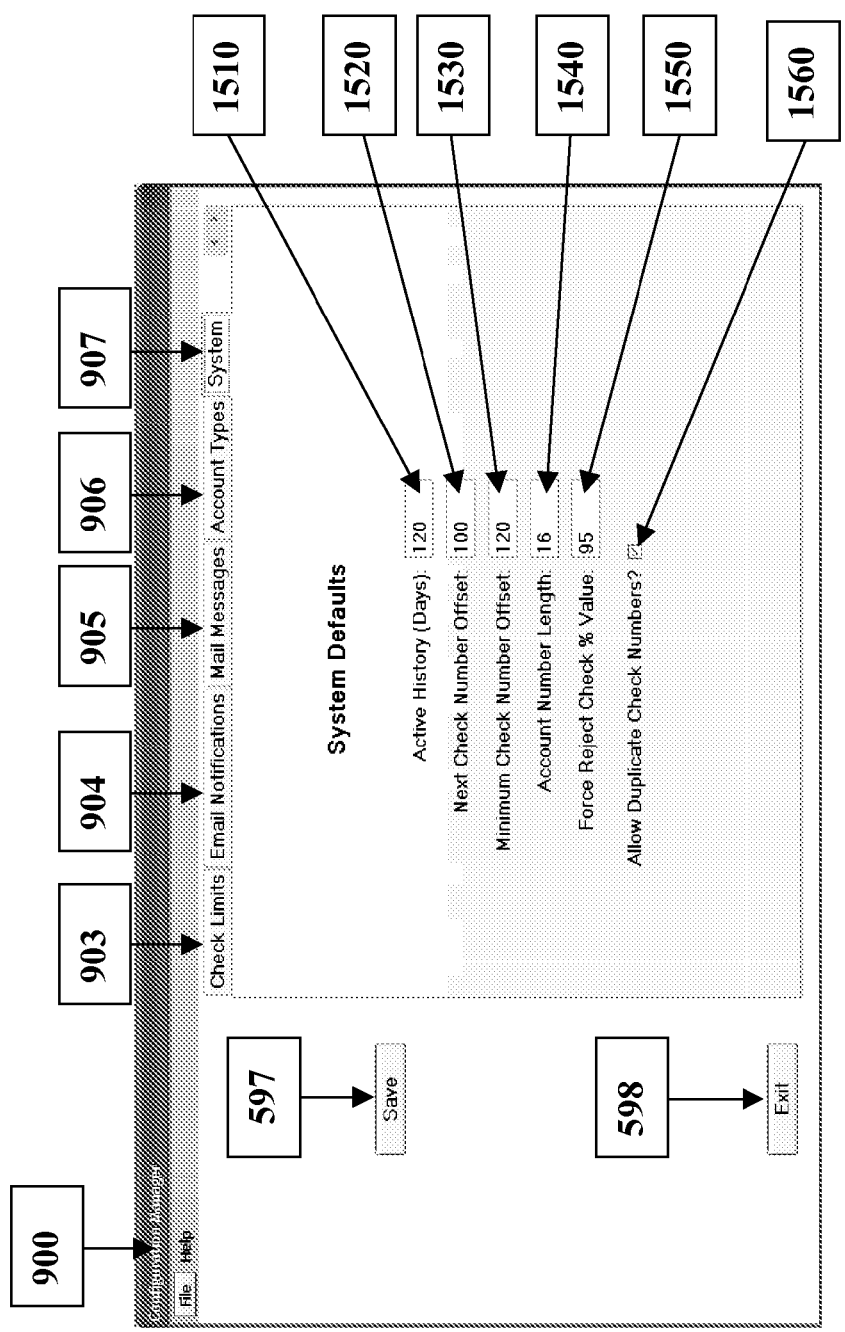

Various system defaults may be configured by selecting the system tab 907 of the configuration manager graphical user interface as shown in FIG. 15. The active history text box 1510 is the number of days that the system keeps historical data before archiving. The next check number offset text box 1520 is set to the amount added to the result of the statistical analysis in the nightly process to forecast the next check number. The minimum check number offset text box 1530 is set to the value that is subtracted from the results of the statistical analysis in the nightly process to forecast the minimum check number to expect. The account number length text box 1540 is set to the length of the account numbers (that is, the number of digits or characters in an account number). The force reject check value text box 1550 is set to the percent at which the system will not allow the teller to cash the check. If the evaluation percent is higher than this value, the teller will not be able to press the cash check button 594 (see FIGS. 5-7). The allow duplicate check numbers check box 1560 may be selected if a duplicate check number can be stored in the database. If this checkbox 1560 is unchecked, the system will automatically flag a duplicate check number as 100% failure.

In an embodiment, the commercial paper fraud detection system may also include a security management tool (not depicted), which may be used to configure the security system. The tool manages the creation and modification of the XML file used by the connection object to connect to the database. Users may be added to the security system, and users may also be deactivated upon termination of employment. For historical data integrity, in an embodiment, a user cannot be deleted from the system, and a deactivated user cannot log into the system. The system is configured to use RSA encryption or single key encryption, among others. The database connection object uses an XML configuration file for the connection string. This file is located in the same directory as the application. The file contains at minimum the name of the data source, the generic user id and the encrypted generic user password needed to connect to the database.

The methods, systems and program products described herein may be provided on any machine-readable media for accomplishing its operations. Various embodiments may be implemented using an existing computer processors, or by a special purpose computer processor for an appropriate system, incorporated for this or another purpose or by a hardwired system. Embodiments of the invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and that can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps. The particular implementations such as the graphical user interfaces as shown in the various exemplary embodiments are illustrative only.

While the invention has been described with reference to a preferred embodiment, it will be understood by those skilled in the art that various changes may be made and equivalents may be substituted for elements thereof without departing from the scope of the invention. For example, the particular numerical calculations described herein are scaled to particular ranges, for example the risk indicator value is between about 0% and about 100%, with 0% be unlikely to be fraudulent and 100% or greater being very likely to be fraudulent. One skilled in the art will readily appreciate that these ranges and calculations may be modified to suit particular needs. For example, the calculations described herein may be readily modified to produce an risk indicator scale ranging from negative values to positive values. Further such modifications will be readily appreciated by the skilled artisan. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A commercial paper fraud detection method comprising the steps of:
   receiving commercial paper by a commercial paper cashing agent;
     wherein said commercial paper is a check;
   scanning said commercial paper for data;
     wherein said data are selected from the group consisting of the identity of the drawer, the identity of the drawee, the check number, the issue date, the payment amount, the account number, the account type, and the date, time, and location of receiving said check;
   determining one or more attributes based on said data;
     wherein said one or more attributes comprise a known/unknown account number attribute and wherein said known/unknown account number attribute has a value of 100% when said account number is unknown to said commercial paper cashing agent, or 0% when said account number is known to said commercial paper cashing agent;
   calculating a risk indicator for said commercial paper;
     wherein said risk indicator is a mathematical function of said attributes; and
   reporting said risk indicator to said commercial paper cashing agent.

2. The system according to claim 1, wherein said commercial paper cashing agent is a bank holding an account against which said commercial paper is drawn and said commercial paper is received with a contemporaneous demand for payment in cash.

3. The system according to claim 1, wherein said commercial paper cashing agent is a bank not holding an account against which said commercial paper is drawn.

4. The system according to claim 1, wherein said commercial paper cashing agent is a merchant and said commercial paper is received in consideration for goods or services.

5. The system according to claim 1, wherein the magnitude of said risk indicator is proportional to the risk that said commercial paper is fraudulent.

6. The system according to claim 1, wherein said mathematical function is addition.

7. The method according to claim 1, wherein said one or more attributes further comprise a duplicate check number attribute, wherein said duplicate check number attribute has a value of 100% when said check number is the same as a check number of a check previously paid for said account number, or 0% when said check number is unique with respect to checks previously paid for said account number.

8. The method according to claim 1, wherein said one or more attributes further comprise an expected check number attribute, wherein said expected check number attribute has a value of from about 0% to about 100%, said value being proportional to the magnitude of the difference between said check number and a calculated prediction of the expected next check number for said account number.

9. The method according to claim 1, wherein said one or more attributes further comprise an expected minimum check number attribute, wherein said expected minimum check number attribute has a value of from about 0% to about 100% when said check number is below a calculated prediction of the expected minimum check number for said account number, said value being proportional to the magnitude of the difference between said check number and said calculated prediction of the expected minimum check number, or 0% when said check number is above a calculated prediction of the expected minimum check number for said account number.

10. The method according to claim 1, wherein said one or more attributes further comprise a location activity attribute, wherein said location activity attribute has a value of from about 0% to about 100%, said value being proportional to the number of checks or the payment amounts thereof previously paid for said account number at different locations of said commercial paper cashing agent.

11. The method according to claim 10, wherein said checks are paid on the same day.

12. The method according to claim 1, wherein said one or more attributes further comprise a payment amount limit attribute, wherein said payment amount limit attribute has a value of 100% when the payment amount is equal to or exceeds a predetermined maximum payment limit, or 0% when the payment amount less than a predetermined maximum payment limit.

13. The method according to claim 1, wherein said one or more attributes further comprise a foreign account attribute, wherein said foreign account attribute has a value of greater than about 0% when the bank holding the account against which said check is drawn is foreign to said commercial paper cashing agent, or 0% when the bank holding the account against which said check is drawn is not foreign to said commercial paper cashing agent.

14. The method according to claim 13, wherein said foreign account attribute has a value of greater than about 0% when the bank holding the account against which said check is drawn is out-of-state with respect to said commercial paper cashing agent, or 0% when the bank holding the account against which said check is drawn is not out-of-state with respect to said commercial paper cashing agent.

15. A commercial paper fraud detection method comprising the steps of:
receiving commercial paper by a commercial paper cashing agent;
wherein said commercial paper is a check;
scanning said commercial paper for data;
wherein said data are selected from the group consisting of the identity of the drawer, the identity of the drawee, the check number, the issue date, the payment amount, the account number, the account type, and the date, time, and location of receiving said check;
determining one or more attributes based on said data;
wherein said one or more attributes comprise an historical activity attribute, wherein said historical activity attribute has a value of from about 0% to about 100%, said value being proportional to the magnitude of the difference between the payment amount of said check and the average or total payment amount of previously paid checks for said account number during a preceding time period;
calculating a risk indicator for said commercial paper,
wherein said risk indicator is a mathematical function of said attributes; and
reporting said risk indicator to said commercial paper cashing agent.

16. The method according to claim 15, wherein said historical activity attribute is an average annual activity attribute, wherein said average annual activity attribute has a value of from about 0% to about 100%, said value being proportional to the magnitude of the difference between the payment amount of said check and the average payment amount of previously paid checks for said account number during one or more preceding years or one or more preceding years to date.

17. The method according to claim 15, wherein said historical activity attribute is a total annual activity attribute, wherein said total annual activity attribute has a value of from about 0% to about 100%, said value being proportional to the magnitude of the difference between the payment amount of said check and the total payment amount of previously paid checks for said account number during one or more preceding years or one or more preceding years to date.

18. The method according to claim 15, wherein said historical activity attribute is an average quarterly activity attribute, wherein said average quarterly activity attribute has a value of from about 0% to about 100%, said value being proportional to the magnitude of the difference between the payment amount of said check and the average payment amount of previously paid checks for said account number during one or more preceding quarters or one or more preceding quarters to date.

19. The method according to claim 15, wherein said historical activity attribute is a total quarterly activity attribute, wherein said total quarterly activity attribute has a value of from about 0% to about 100%, said value being proportional to the magnitude of the difference between the payment amount of said check and the total payment amount of previously paid checks for said account number during one or more preceding quarters or one or more preceding quarters to date.

20. The method according to claim 15, wherein said historical activity attribute is an average monthly activity attribute, wherein said average monthly activity attribute has a value of from about 0% to about 100%, said value being proportional to the magnitude of the difference between the payment amount of said check and the average payment amount of previously paid checks for said account number during one or more preceding months or one or more preceding months to date.

21. The method according to claim 15, wherein said historical activity attribute is a total monthly activity attribute, wherein said total monthly activity attribute has a value of from about 0% to about 100%, said value being proportional to the magnitude of the difference between the payment amount of said check and the total payment amount of previously paid checks for said account number during one or more preceding months or one or more preceding months to date.

22. The method according to claim 15, wherein said historical activity attribute is an average biweekly activity attribute, wherein said average biweekly activity attribute has a value of from about 0% to about 100%, said value being proportional to the magnitude of the difference between the payment amount of said check and the average payment amount of previously paid checks for said account number during one or more preceding biweeks or one or more preceding biweeks to date.

23. The method according to claim 15, wherein said historical activity attribute is a total biweekly activity attribute, wherein said total biweekly activity attribute has a value of from about 0% to about 100%, said value being proportional to the magnitude of the difference between the payment amount of said check and the total payment amount of previously paid checks for said account number during one or more preceding biweeks or one or more preceding biweeks to date.

24. The method according to claim 15, wherein said historical activity attribute is an average weekly activity attribute, wherein said average weekly activity attribute has a value of from about 0% to about 100%, said value being proportional to the magnitude of the difference between the payment amount of said check and the average payment amount of previously paid checks for said account number during one or more preceding weeks or one or more preceding weeks to date.

25. The method according to claim 15, wherein said historical activity attribute is a total weekly activity attribute, wherein said total weekly activity attribute has a value of from about 0% to about 100%, said value being proportional to the magnitude of the difference between the payment amount of said check and the total payment amount of previously paid checks for said account number during one or more preceding weeks or one or more preceding weeks to date.

* * * * *